US007545973B2

(12) United States Patent
Hamanaka

(10) Patent No.: US 7,545,973 B2
(45) Date of Patent: Jun. 9, 2009

(54) IMAGE MATCHING SYSTEM USING 3-DIMENSIONAL OBJECT MODEL, IMAGE MATCHING METHOD, AND IMAGE MATCHING PROGRAM

(75) Inventor: Masahiko Hamanaka, Tokyo (JP)

(73) Assignee: NEC Corporation, Tokyo (JP)

(*) Notice: Subject to any disclaimer, the term of this patent is extended or adjusted under 35 U.S.C. 154(b) by 775 days.

(21) Appl. No.: 10/520,661

(22) PCT Filed: Jul. 8, 2003

(86) PCT No.: PCT/JP03/08642

§ 371 (c)(1),
(2), (4) Date: Jan. 10, 2005

(87) PCT Pub. No.: WO2004/008392

PCT Pub. Date: Jan. 22, 2004

(65) Prior Publication Data

US 2006/0120589 A1 Jun. 8, 2006

(30) Foreign Application Priority Data

Jul. 10, 2002 (JP) ............... 2002-201118

(51) Int. Cl.
G06K 9/00 (2006.01)
(52) U.S. Cl. .................. 382/154; 382/209; 382/118
(58) Field of Classification Search ........... 382/154
See application file for complete search history.

(56) References Cited

U.S. PATENT DOCUMENTS 6,002,782 A 12/1999 Dionysian (Continued)

FOREIGN PATENT DOCUMENTS

EP 1 143 375 A2 10/2001

(Continued)

OTHER PUBLICATIONS

*Face Recoginatin with Automatic Compensation for Both of Pose and Illumination Changes*Rui Ishiyama and Shizuo Sakamoto. 2005.

(Continued)

Primary Examiner—Matthew C. Bella
Assistant Examiner—Sath V. Perungavoor
(74) Attorney, Agent, or Firm—Sughrue Mion, PLLC

(57) ABSTRACT

Even when only a small number of reference images are available for each object, it is possible to search at high speed a reference image stored in a database from an input image of an object imaged with a different pose and a different illumination condition. A reference image matching result storage section (50) inputs reference images from a reference image storage section (70) and stores in advance results of matching of the input images with representative 3-dimensional object models of a representative 3-dimensional object model storage section (20). According to each representative 3-dimensional object model, image generation means (30) generates a comparison image having an input condition similar to the input image obtained from the image input means (10). Image matching means (40) calculates similarity between the input image and the image generated. Result matching means (60) calculates similarity between the matching result of the image matching means (40) and the reference image stored in the reference image matching result storage section (50), extracts reference images having similar matching results in the descending order of the similarity, and displays them on result display means (80).

33 Claims, 19 Drawing Sheets

U.S. PATENT DOCUMENTS

| | | | |
|---|---|---|---|
| 6,545,673 B1 * | 4/2003 | Shiitani et al. | 345/418 |
| 6,628,811 B1 * | 9/2003 | Nagao et al. | 382/118 |
| 6,847,733 B2 * | 1/2005 | Savakis et al. | 382/225 |
| 6,956,569 B1 * | 10/2005 | Roy et al. | 345/418 |
| 6,975,755 B1 * | 12/2005 | Baumberg | 382/154 |
| 2001/0020946 A1 | 9/2001 | Kawakami et al. | |
| 2006/0120589 A1 * | 6/2006 | Hamanaka | 382/154 |

FOREIGN PATENT DOCUMENTS

| | | |
|---|---|---|
| EP | 1139269 A2 | 10/2001 |
| JP | S62-078684 A | 4/1987 |
| JP | H08-315152 A | 11/1996 |
| JP | H09-061128 A | 3/1997 |
| JP | H09-091436 A | 4/1997 |
| JP | 2000-306099 A | 11/2000 |
| JP | 2000-322577 A | 11/2000 |
| JP | 2001-012925 A | 1/2001 |
| JP | 2001-283216 A | 10/2001 |
| JP | 2001-283222 A | 10/2001 |

OTHER PUBLICATIONS

*IAPR Workshop on Machine Vision Applications Sponsored by IAPR MVA Organizing Committee* Nov. 28-30, 2000.

*The Transaction of the Institute of Electronics, Information and Communication Engineers,* D-II, vol. J78-DII, No. 11(1995), pp. 1639-1649.

*IEEE Transactions on Pattern Analysis and Machine Intelligence* vol. 23, No. 6 ITPIDJ (ISSN1062-8828) Jun. 2001.

* cited by examiner

20 REPRESENTATIVE THREE-DIMENSIONAL OBJECT MODEL STORAGE SECTION

70 REFERENCE IMAGE STORAGE SECTION $R_1$     $R_2$     $R_3$  ...

50 REFERENCE IMAGE MATCHING RESULT STORAGE SECTION

| REFERENCE IMAGE NUMBER | OBJECT MODEL NUMBER AND SIMILARITY | | |
|---|---|---|---|
| | FIRST PLACE | SECOND PLACE | THIRD PLACE ... |
| $R_1$ | $C_2$ : 0.98 | $C_5$ : 0.96 | $C_3$ : 0.95 |
| $R_2$ | $C_3$ : 0.95 | $C_2$ : 0.93 | $C_{10}$ : 0.90 |
| $R_3$ | $C_1$ : 0.97 | $C_9$ : 0.96 | $C_8$ : 0.93 |

INPUT IMAGE

|  | OBJECT MODEL NUMBER AND SIMILARITY |
|---|---|
|  | FIRST PLACE   SECOND PLACE   THIRD PLACE   · · · |
| INPUT IMAGE | $C_2$ : 0.96    $C_5$ : 0.94    $C_3$ : 0.92 |

|  | REFERENCE IMAGE NUMBER AND SIMILARITY |
|---|---|
|  | FIRST PLACE   SECOND PLACE   THIRD PLACE   · · · |
| INPUT IMAGE | $R_1$ : 0.92    $R_5$ : 0.89    $R_2$ : 0.87 |

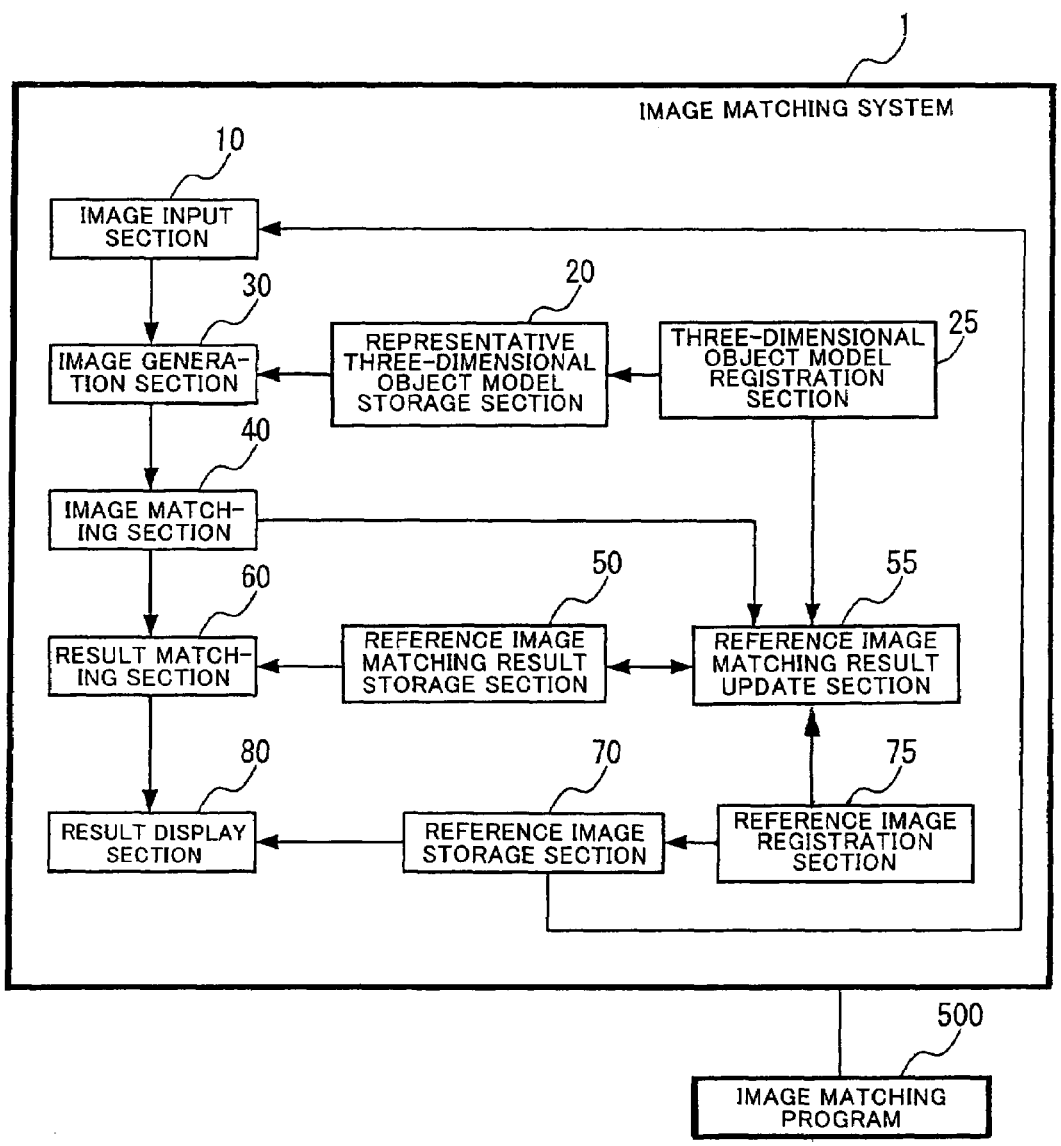

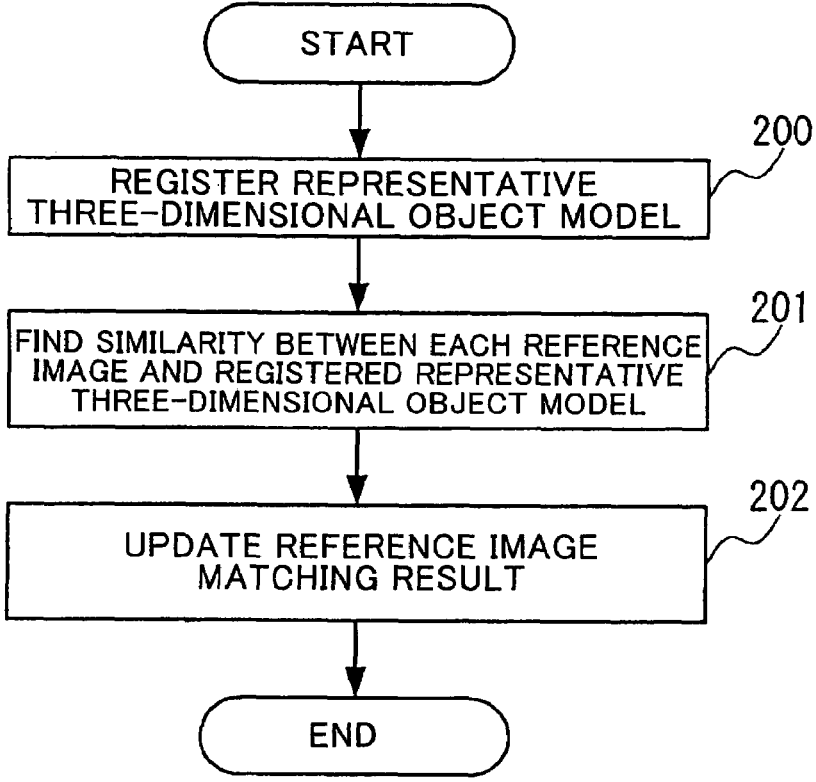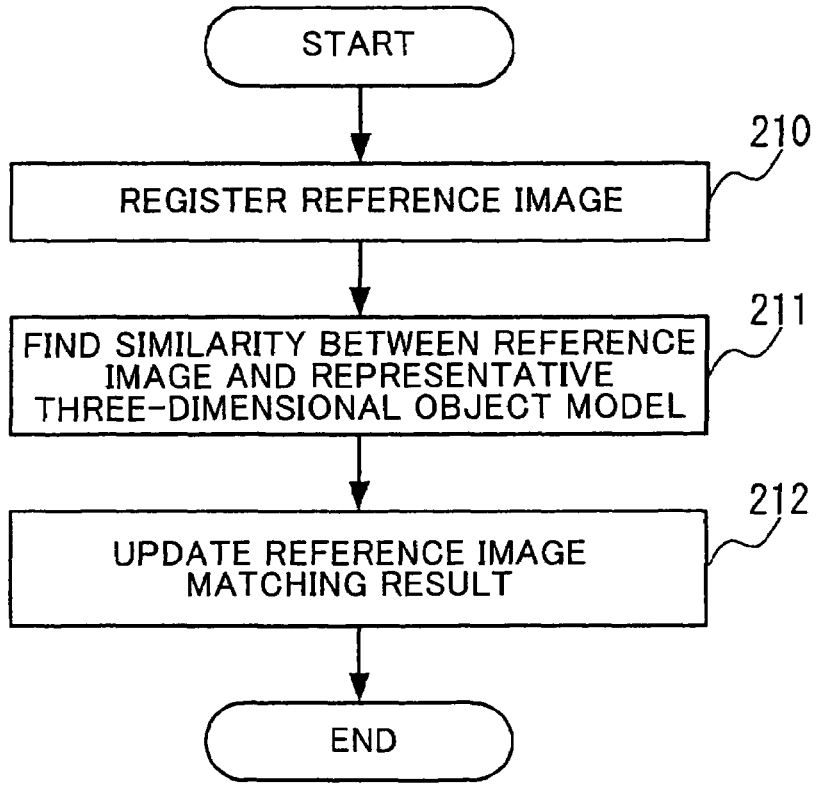

FIG.12

| REFERENCE IMAGE NUMBER | OBJECT MODEL NUMBER AND SIMILARITY |
|---|---|
| $R_1$ | $C_{51}$ : 0.97 |
| $R_2$ | $C_{51}$ : 0.92 |
| $R_3$ | $C_{51}$ : 0.83 |
| ⋮ | |

FIG.13

50 REFERENCE IMAGE MATCHING RESULT STORAGE SECTION

| REFERENCE IMAGE NUMBER | OBJECT MODEL NUMBER AND SIMILARITY | | |
|---|---|---|---|
| | FIRST PLACE | SECOND PLACE | THIRD PLACE ··· |
| $R_1$ | $C_2$ : 0.98 | $C_{51}$ : 0.97 | $C_5$ : 0.96 |
| $R_2$ | $C_3$ : 0.95 | $C_2$ : 0.93 | $C_{51}$ : 0.92 |
| $R_3$ | $C_1$ : 0.97 | $C_9$ : 0.96 | $C_8$ : 0.93 |
| ⋮ | | | |

FIG.14

| REFERENCE IMAGE NUMBER | OBJECT MODEL NUMBER AND SIMILARITY | | |
|---|---|---|---|
| | FIRST PLACE | SECOND PLACE | THIRD PLACE ··· |
| $R_{101}$ | $C_2$ : 0.99 | $C_6$ : 0.98 | $C_3$ : 0.96 |

FIG.15

50 REFERENCE IMAGE MATCHING RESULT STORAGE SECTION

| REFERENCE IMAGE NUMBER | OBJECT MODEL NUMBER AND SIMILARITY | | |
|---|---|---|---|
| | FIRST PLACE | SECOND PLACE | THIRD PLACE · · · |
| $R_1$ | $C_2$ : 0.98 | $C_5$ : 0.96 | $C_3$ : 0.95 |
| $R_2$ | $C_3$ : 0.95 | $C_2$ : 0.93 | $C_{10}$ : 0.90 |
| $R_3$ | $C_1$ : 0.97 | $C_9$ : 0.96 | $C_8$ : 0.93 |
| · | | · | |
| · | | · | |
| $R_{101}$ | $C_2$ : 0.99 | $C_6$ : 0.98 | $C_3$ : 0.96 |

21 REFERENCE THREE-DIMENSIONAL OBJECT MODEL STORAGE SECTION

|  | OBJECT MODEL NUMBER AND SIMILARITY | | |
|---|---|---|---|
|  | FIRST PLACE | SECOND PLACE | THIRD PLACE ··· |
| INPUT IMAGE | $B_5$ : 0.99 | $B_1$ : 0.98 | $B_2$ : 0.96 |

# IMAGE MATCHING SYSTEM USING 3-DIMENSIONAL OBJECT MODEL, IMAGE MATCHING METHOD, AND IMAGE MATCHING PROGRAM

This application is a national stage entry of PCT/JP03/08642 filed on Jul. 8, 2003 and claims priority to JP2002-201118 filed on Jul. 10, 2002.

TECHNICAL FIELD

The present invention relates to an image matching system using a three-dimensional object model, an image matching method, and an image matching program. In particular, the present invention relates to an image matching system capable of retrieving a reference image stored in a database (DB) on the basis of an input image of an object (human face) picked up under a different pose and illumination condition, and its image matching method and image matching program.

BACKGROUND ART

An example of a conventional image matching system is described in Tsutada etc., "Dictionary configuration method for discriminating person independently of face direction," The Transactions of the Institute of Electronics, Information and Communication Engineers, D-II, Vol. J78-D-II, No. 11 (1995), pp. 1639-1649 (hereafter referred to as first conventional technique). As shown in FIG. 26, an image matching system according to the first image matching system includes an image input section 10, an image matching section 40, a result display section 80, a reference image storage section 70, and a reference image registration section 75.

The conventional image matching system having such a configuration operates as hereafter described.

Reference images of various objects (such as reference face images of persons) picked up are previously stored in the reference image storage section 70 by the reference image registration section 75. However, reference images greatly change depending on the condition at the time of imaging (conditions such as the pose and illumination). With respect to one object, therefore, a plurality of (a large number of) images imaged under various conditions are previously stored.

The image input section 10 is implemented by using, for example, a camera. The imaged input image is stored in a memory (not illustrated). The image matching section 40 compares the input image obtained from the image input section 10 with each of reference images obtained from the reference image storage section 70, calculates similarities (or distance values) of respective features, and selects a reference image having the greatest similarity (or the shortest distance) for each object. Each image is represented by gray level features. In the calculation of similarity between features and the calculation of the distance value, for example, the normalized correlation and Euclidean distance are used. The result display section 80 displays a reference image of an object having the greatest similarity selected from among the reference images, as a matching result (or displays candidate reference images in the descending order of the similarity).

Another example of a conventional image matching system is described in Japanese Patent Application Laid-Open No. 2000-322577 (hereafter referred to as second conventional technique). As shown in FIG. 28, the conventional image matching system includes an image input section 10, an image conversion section 35, a partial image matching section 45, a result display section 80, a reference image registration section 75, a representative three-dimensional object model storage section 20, and a three-dimensional object model registration section 25.

The conventional image matching system having such a configuration operates as hereafter described.

One or more representative three-dimensional object models obtained from the three-dimensional object model registration section 25 are previously stored in the representative three-dimensional object model storage section 20. As regards a partial region common to the input image obtained from the image input section 10 and each of the reference image obtained from the reference image storage section 70, the image conversion section 35 converts the input image and/or the reference image so as to make the input condition (such as the pose condition) the same by using a three-dimensional object model obtained from the representative three-dimensional object model storage section 20, and thereby generates partial images.

For example, as shown in FIG. 29, the partial region is a feature portion such as an eye, a nose or a mouth. By previously specifying a feature point with respect to each of the images and the three-dimensional object models, correspondence can be taken. The partial image matching section 45 compares the converted input image obtained from the image conversion section 35 with a partial image of each of the reference images, calculates respective average similarities, and selects a reference image having the greatest similarity for each object. The result display section 80 displays an object having the greatest similarity among the reference images, as a matching result.

DISCLOSURE OF INVENTION

The above-described conventional techniques have various problems described hereafter.

First, the above-described first and second conventional techniques have a problem that a large number of reference images of an object to be registered, picked up under various conditions become necessary.

The reason is as follows: the input image is directly compared with a reference image; if the input image pickup condition is not restricted, therefore, it is necessary to previously prepare reference images that are close to the input image in pickup condition in order to cope with a large number of pose and illumination conditions. As a matter of fact, however, there are infinite possibilities in the pose and illumination conditions, and it is practically impossible to previously prepare a large number of images associated with various conditions.

Secondly, in the second conventional technique, the input image or the reference image is converted so as to square them with each other in pose, and comparison is conducted. If the number of the reference images of a three-dimensional object model is not sufficient or the pose is largely different, therefore, distortion caused by the conversion becomes large and matching cannot be conducted correctly, resulting in a problem. There is also a problem that it is very difficult to square the illumination conditions with each other by conducting conversion and a common region certainly needs to be present because images are compared in the common region.

Thirdly, the conventional techniques have a problem that it takes a considerably long time to conduct matching.

The reason is as follows: in the conventional techniques, the input image is compared with a plurality of reference images of respective objects; if the number of objects is M and the number of reference images of each object is L, therefore, image comparison must be conducted at least L X M times.

An object of the present invention is to provide an image matching system, an image matching method, and an image matching program that make it possible to retrieve a reference image registered in a database on the basis of an input image as regards images picked under different pose and illumination conditions every object, even when only a small number of reference images are available.

Another object of the present invention is to provide an image matching system, an image matching method, and an image matching program that make it possible to conduct matching with a small number of reference images of three-dimensional object models without conducting processing such as converting the input image or the reference image so as to make the pose coincide and that makes it possible to conduct matching even if a region common to the images is not present.

Another object of the present invention is to provide an image matching system, an image matching method, and an image matching program that make it possible to conduct image matching without always generating a certain necessary number of three-dimensional objects with respect to all objects.

Still another object of the present invention is to provide an image matching system, an image matching method, an image matching program that make it possible to conduct retrieval at high speed even when a database has reference images concerning a large number of objects registered therein.

The present invention provides an image matching system for retrieving a reference image similar to an input image, the image matching system including means for making a match between the input image and a plurality of representative three-dimensional object models, means for making a match between the reference image and the representative three-dimensional object models, and means for retrieving the reference image similar to the input image by using a result of the match between the input image and the representative three-dimensional object models and a result of the match between the reference image and the representative three-dimensional object models.

The image matching system may further include means for finding a reference three-dimensional object model associated with the reference image similar to the input image, and means for newly retrieving the reference image similar to the input image by using the reference three-dimensional object model and the input image.

The image matching system may further include means for finding a reference three-dimensional object model associated with the reference image similar to the input image, conversion means for squaring an input condition of the input image with that of the reference image by converting the input image and/or the reference image on the basis of the reference three-dimensional object model, and means for retrieving the reference image associated with the input image by making a match between the input image and reference image squared in input condition.

In the image matching system, the conversion means may previously convert the reference image, and square an input condition of the input image with that of the reference image.

The image matching system may include image input means for inputting the input image, a representative three-dimensional object model storage section for storing a plurality of representative three-dimensional object models, image generation means for generating at least one comparison image close in input condition to the input image every representative three-dimensional object model on the basis of the representative three-dimensional object models stored in the representative three-dimensional object model storage section, image matching means for calculating a similarity between the input image and each of the comparison images generated by the image generation means, selecting a maximum similarity with respect to comparison images associated with each representative three-dimensional object model, and regarding the maximum similarity as a similarity between the input image and the representative three-dimensional object model, a reference image storage section for storing the reference images of objects, a reference image matching result storage section for storing similarities between the reference images stored in the reference image storage section and representative three-dimensional object models stored in the representative three-dimensional object model storage section, and result matching means for extracting the reference image similar to the input image on the basis of similarities between the input image and the representative three-dimensional object models calculated by the image matching means and similarities between the reference images and the representative three-dimensional object models stored in the reference image matching result storage section.

The image matching system may further include three-dimensional object model registration means for registering representative three-dimensional object models in the representative three-dimensional object model storage section, reference image registration means for registering reference images in the reference image storage section, and reference image matching result update means for conducting calculation of the similarities using the image matching means, on a combination of a reference image and a representative three-dimensional object model newly generated by registration, when a new representative three-dimensional object model is registered in the representative three-dimensional object model storage section by the three-dimensional object model registration means, or when a new reference image is registered in the reference image storage section by the reference image registration means, and adding a result of the calculation to results in the reference image matching result storage section.

In the image matching system, the image matching means may calculate a similarity between the input image and a representative three-dimensional object model every partial region, the reference image matching result storage section may store similarities between the reference images stored in the reference image storage section and representative three-dimensional object models stored in the representative three-dimensional object model storage section, every partial region, and the result matching means may extract the reference image similar to the input image on the basis of similarities between the input image and the representative three-dimensional object models calculated by the image matching means every partial region and similarities between the reference images and the representative three-dimensional object models, stored in the reference image matching result storage section every partial region.

In the image matching system, the result matching means may calculate similarities between similarities between the input image and the representative three-dimensional object models and similarities between the reference images and the representative three-dimensional object models, and in the calculation provide the resultant similarities with weights on the basis of candidate precedence of similarities between the input image and the comparison images and the representative three-dimensional object models.

The image matching system may include image input means for inputting the input image, a representative three-dimensional object model storage section for storing a plurality of representative three-dimensional object models, image generation means for generating at least one comparison image close in input condition to the input image every representative three-dimensional object model on the basis of the representative three-dimensional object models stored in the representative three-dimensional object model storage section, image matching means for calculating a similarity between the input image and each of the comparison images generated by the image generation means, selecting a maximum similarity with respect to comparison images associated with each representative three-dimensional object model, and regarding the maximum similarity as a similarity between the input image and the representative three-dimensional object model, a reference image storage section for storing the reference images of objects, a reference image matching result storage section for storing similarities between the reference images stored in the reference image storage section and representative three-dimensional object models stored in the representative three-dimensional object model storage section, result matching means for extracting the reference image similar to the input image on the basis of similarities between the input image and the representative three-dimensional object models calculated by the image matching means and similarities between the reference images and the representative three-dimensional object models stored in the reference image matching result storage section, a reference three-dimensional object model storage section for storing reference three-dimensional object models associated with the reference images stored in the reference image storage section, second image generation means for obtaining reference three-dimensional object models associated with reference images extracted from the result matching means, from the reference three-dimensional object model storage section, and generating at least one second comparison image close in input condition to the input image every reference three-dimensional object model on the basis of the obtained reference three-dimensional object models, and second image matching means for calculating similarities between the input image and second comparison images generated by the second image generation means, selecting a maximum similarity from among second comparison images associated with each of the reference three-dimensional object models, and regarding the maximum similarity as a similarity between the input image and the reference three-dimensional object model.

The image matching may further include three-dimensional object model registration means for registering representative three-dimensional object models in the representative three-dimensional object model storage section, reference image registration means for registering reference images in the reference image storage section, and reference image matching result update means for conducting calculation of the similarities using the image matching means, on a combination of a reference image and a representative three-dimensional object model newly generated by registration, when a new representative three-dimensional object model is registered in the representative three-dimensional object model storage section by the three-dimensional object model registration means, or when a new reference image is registered in the reference image storage section by the reference image registration means, and adding a result of the calculation to results in the reference image matching result storage section, and three-dimensional object model generation means responsive to registration of a similarity between the reference image and the representative three-dimensional object model in the reference image matching result storage section conducted by the reference image matching result update means, for generating the reference three-dimensional object model associated with the reference image by combining the representative three-dimensional object models stored in the representative three-dimensional object model storage section on the basis of the similarity, and registering the generated reference three-dimensional object model in the reference three-dimensional object model storage section.

In the image matching system, the three-dimensional object model generation means may generate a reference three-dimensional object model associated with each reference image by combining representative three-dimensional object models stored in the representative three-dimensional object model storage section every partial region, on the basis of similarities obtained every partial region between reference images stored in the reference image storage section and representative three-dimensional object models stored in the representative three-dimensional object model storage section, and register the generated reference three-dimensional object model in the reference three-dimensional object model storage section.

In the image matching system, the image matching means may calculate a similarity between the input image and a representative three-dimensional object model every partial region, the reference image matching result storage section may store similarities between the reference images stored in the reference image storage section and representative three-dimensional object models stored in the representative three-dimensional object model storage section, every partial region, and the result matching means may extract the reference image similar to the input image on the basis of similarities between the input image and the representative three-dimensional object models calculated by the image matching means every partial region and similarities between the reference images and the representative three-dimensional object models, stored in the reference image matching result storage section every partial region.

In the image matching system, the result matching means may calculate similarities between similarities between the input image and the representative three-dimensional object models and similarities between the reference images and the representative three-dimensional object models, and in the calculation, provide the resultant similarities with weights on the basis of candidate precedence of similarities between the input image and the comparison images and the representative three-dimensional object models.

The image matching system may include image input means for inputting the input image, a representative three-dimensional object model storage section for storing a plurality of representative three-dimensional object models, image generation means for generating at least one comparison image close in input condition to the input image every representative three-dimensional object model on the basis of the representative three-dimensional object models stored in the representative three-dimensional object model storage section, image matching means for calculating a similarity between the input image and each of the comparison images generated by the image generation means, selecting a maximum similarity with respect to comparison images associated with each representative three-dimensional object model, and regarding the maximum similarity as a similarity between the input image and the representative three-dimensional object model, a reference image storage section for storing the reference images of objects, a reference image matching result storage section for storing similarities between the reference images stored in the reference image storage section and representative three-dimensional object models stored in the representative three-dimensional object model storage section, result matching means for extracting the reference image similar to the input image on the basis of similarities between the input image and the representative three-dimensional object models calculated by the image matching means and similarities between the reference images and the representative three-dimensional object models stored in the reference image matching result storage section, a reference three-dimensional object model storage section for storing reference three-dimensional object models associated with the reference images stored in the reference image storage section, image conversion means for obtaining reference three-dimensional object models associated with reference images extracted from the result matching means, from the reference three-dimensional object model storage section, squaring an input condition of the input image with that of the reference image extracted by the result matching means by converting the input image and/or the reference image extracted by the result matching means, on the basis of the obtained reference three-dimensional object models, and generating partial images respectively of the input image and the reference image squared in input condition with each other, and partial image matching means for calculating a similarity between the partial image of the input image and the partial image of the reference image generated by the image conversion means.

The image matching system may further include three-dimensional object model registration means for registering representative three-dimensional object models in the representative three-dimensional object model storage section, reference image registration means for registering reference images in the reference image storage section, and reference image matching result update means for conducting calculation of the similarities using the image matching means, on a combination of a reference image and a representative three-dimensional object model newly generated by registration, when a new representative three-dimensional object model is registered in the representative three-dimensional object model storage section by the three-dimensional object model registration means, or when a reference image is registered in the reference image storage section by the reference image registration means, and adding a result of the calculation to results in the reference image matching result storage section, and three-dimensional object model generation means responsive to registration of a similarity between the reference image and the representative three-dimensional object model in the reference image matching result storage section conducted by the reference image matching result update means, for generating the reference three-dimensional object model associated with the reference image by combining the representative three-dimensional object models stored in the representative three-dimensional object model storage section on the basis of the similarity, and registering the generated reference three-dimensional object model in the reference three-dimensional object model storage section.

In the image matching system, the three-dimensional object model generation means may generate a reference three-dimensional object model associated with each reference image by combining representative three-dimensional object models stored in the representative three-dimensional object model storage section every partial region, on the basis of similarities obtained every partial region between reference images stored in the reference image storage section and representative three-dimensional object models stored in the representative three-dimensional object model storage section, and register the generated reference three-dimensional object model in the reference three-dimensional object model storage section.

In the image matching system, the image matching means may calculate a similarity between the input image and a representative three-dimensional object model every partial region, the reference image matching result storage section may store similarities between the reference images stored in the reference image storage section and representative three-dimensional object models stored in the representative three-dimensional object model storage section, every partial region, and the result matching means may extract the reference image similar to the input image on the basis of similarities between the input image and the representative three-dimensional object models calculated by the image matching means every partial region and similarities between the reference images and the representative three-dimensional object models, stored in the reference image matching result storage section every partial region.

In the image matching system, the result matching means may calculate similarities between similarities between the input image and the representative three-dimensional object models and similarities between the reference images and the representative three-dimensional object models, and in the calculation, provide the resultant similarities with weights on the basis of candidate precedence of similarities between the input image and the comparison images and the representative three-dimensional object models.

In the image matching system, the object may be a human face.

According to the present invention, effects described hereafter are achieved.

A first effect will now be described. With respect to an input image of an object picked up under a different input condition such as a different pose and illumination condition a reference image of the same object can be retrieved, even if only one reference image or a small number of reference images are present. Furthermore, matching can be conducted with a small number of reference images of three-dimensional object models, without conducting processing such as converting the input image or the reference image so as to make their poses coincide with each other. In addition, matching can be conducted even if a region common to the images is not present. Furthermore, image matching becomes possible without always generating a predetermined number of three-dimensional object models for every object.

The reason is that a reference image is retrieved by comparing a result of matching between the input image and representative three-dimensional object models with a result of matching between reference images and representative three-dimensional object models. The reason is also that a reference three-dimensional object model is generated by combining representative three-dimensional object models and subjected to matching.

A second effect is that a reference image can be retrieved at high speed with respect to an input image.

The reason is that matching of representative three-dimensional object models less than the objects is conducted and image matching is conducted by using the calculation of similarity of the matching result. Even when conducting matching with a reference three-dimensional object model, reference images having high similarity are extracted by using representative three-dimensional object models, and then matching of high precedence candidates with reference three-dimensional object models is conducted.

BRIEF DESCRIPTION OF DRAWINGS

FIG. 9 is a block diagram showing a configuration of an image matching system according to a second embodiment of the present invention;

FIG. 10 is a flow chart showing operation conducted at the time of three-dimensional object model registration in a second embodiment;

FIG. 11 is a flow chart showing operation conducted at the time of reference image registration in a second embodiment;

FIG. 12 is a diagram showing a concrete example of a matching result of a three-dimensional object model registered in a second embodiment;

FIG. 13 is a diagram showing a concrete example of update of a reference image matching result in a second embodiment;

FIG. 14 is a diagram showing a concrete example of a matching result of a registered reference image in a second embodiment;

FIG. 15 is a diagram showing a concrete example of update of a reference image matching result in a second embodiment;

BEST MODE FOR CARRYING OUT THE INVENTION

Hereafter, embodiments of the present invention will be described in detail with reference to the drawings.

Figure 1:
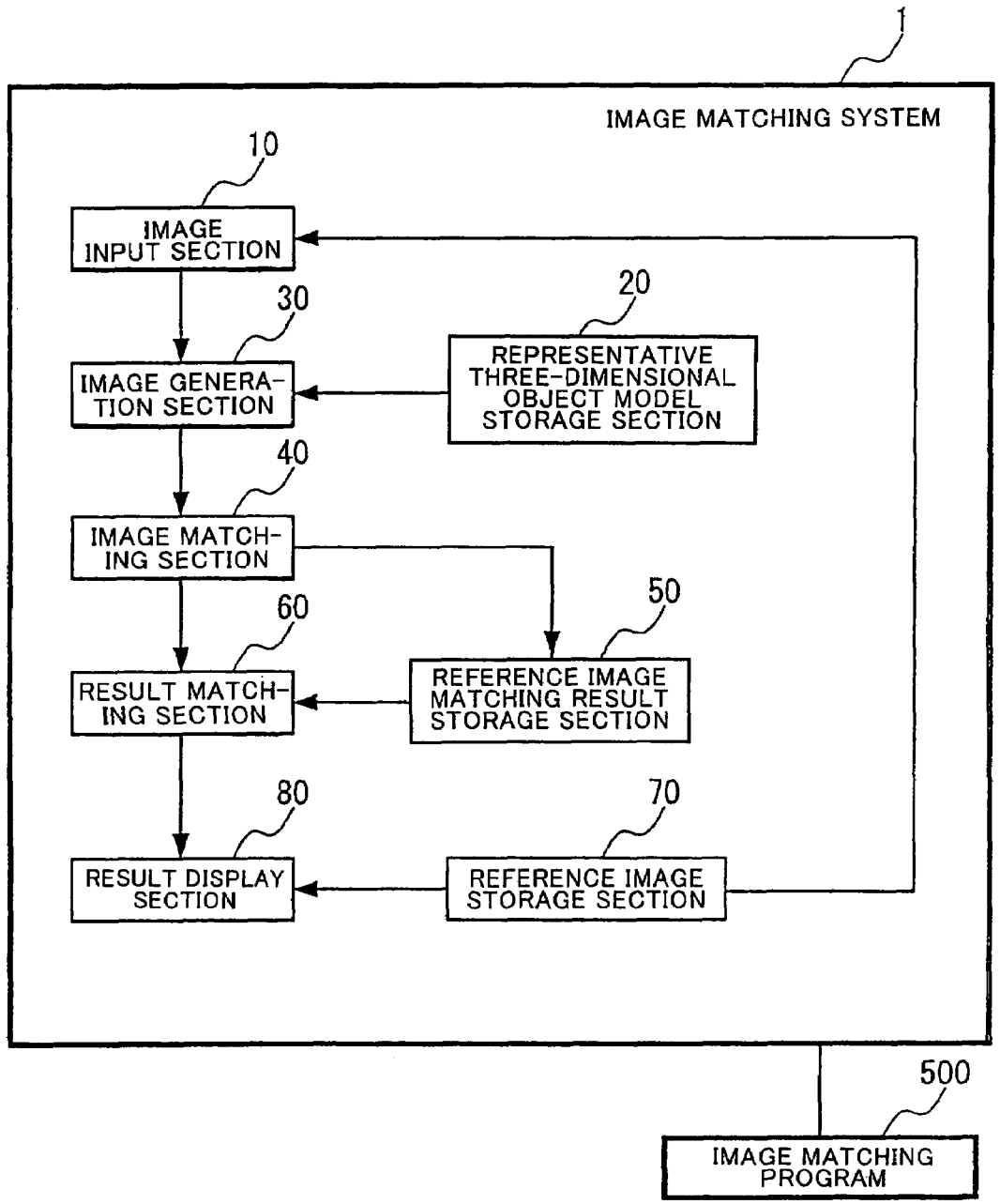
FIG. 1 is a block diagram showing a configuration of an image matching system according to a first embodiment of the present invention.

With reference to FIG. 1, an image matching system according to a first embodiment of the present invention includes an image input section 10, an image generation section 30, an image matching section 40, a result matching section 60, a result display section 80, a reference image storage section 70, a representative three-dimensional object model storage section 20, and a reference image matching result storage section 50.

Representative three-dimensional object models (three-dimensional shapes of objects and textures on object surfaces) are previously registered in the representative three-dimensional object model storage section 20. The three-dimensional object models can be generated by using, for example, a three-dimensional shape measurement apparatus described in Japanese Patent Application Laid-Open No. 2001-12925 or an apparatus that reconstructs a three-dimensional shape from a plurality of images picked up with a large number of cameras and that is described in Japanese Patent Application Laid-Open No. 9-91436.

Figure 27:
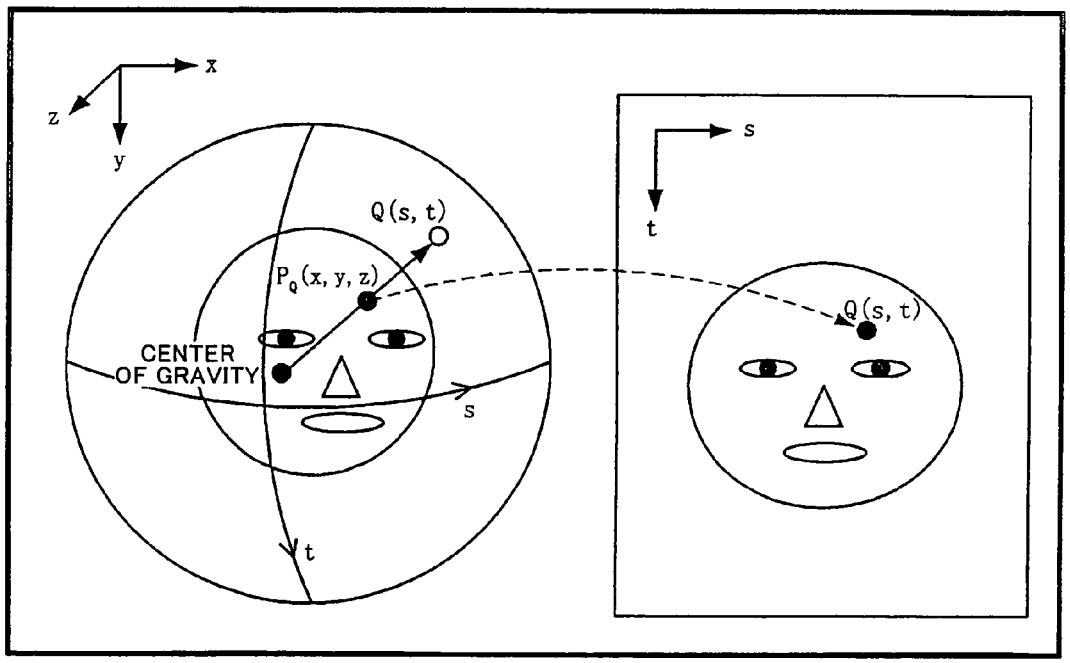
FIG. 27 is a diagram showing a concrete example of coordinates of a three-dimensional object model.

As shown in FIG. 27, the three-dimensional object model has a shape $P_Q(x, y, z)$ and a texture $T_Q(R, G, B)$ in a three-dimensional space $(x, y, z)$ at an object surface, as information. Q represents an index of a point on the object surface, and corresponds to coordinates of a point $Q(s,t)$ obtained by projecting a point on the object surface onto a sphere centering around the center of gravity of the object from the center of gravity. For the purpose of matching, CG images for learning under various illumination conditions are previously generated by using three-dimensional object models and computer graphics, and a basic image group is derived by conducting principal component analysis on the CG images for learning.

The image generation section 30 generates a plurality of comparison images close in illumination condition to an input image obtained from the image input section 10, while supposing a pose condition on the basis of a representative three-dimensional object model obtained from the representative three-dimensional object model storage section 20. Here, the generation of the comparison image close in illumination condition to the input image can be implemented by conducting coordinate conversion on a basic image group obtained beforehand on the basis of the supposed pose condition and obtaining coefficients of a linear sum by using the least square method so as to make the linear sum of the basic images subjected to the coordinate conversion close to the input image.

A technique for generating a comparison image close to the input image from the three-dimensional object model is described in, for example, "Face matching using automatic correction of both illumination condition and pose," Technical Report of the Institute of Electronics, Information and Communication Engineers, Vol. 101, No. 524, PRMU2001-153~175 (2001), pp. 59-64.

The image matching section 40 estimates the pose by comparing the input image obtained from the image input section 10 with each of comparison images obtained from the image generation section 30, calculating a similarity between the input image and each of the comparison images, and selecting a comparison image having the greatest similarity for each object.

The image generation section 30 and the image matching section 40 handles each of the reference images stored in the reference image storage section 70 serving as a database (DB) that stores reference images as the input image and matches representative three-dimensional object models stored in the representative three-dimensional object model storage section 20 with each of the reference images. Results obtained by the matching are previously stored in the reference image matching result storage section 50.

The result matching section 60 compares a result of matching of the input image obtained from the image input section 10 conducted by the image generation section 30 and the image matching section 40 with the matching result of each reference image in the reference image matching result storage section 50, and extracts reference images having similar matching results, in the descending order of the similarity. The result display section 80 displays an object having the greatest similarity as a matching result.

Reference images which are two-dimensional images of an object to be retrieved are registered in the reference image storage section 70. As for the reference images, there are no restrictions to the input condition including the illumination and pose. At least one image is registered every object (retrieval subject).

A plurality of representative three-dimensional object models are stored in the representative three-dimensional object model storage section 20.

General operation of the first embodiment will now be described in detail with reference to FIG. 1 and a flow chart shown in FIG. 2.

Figure 2:
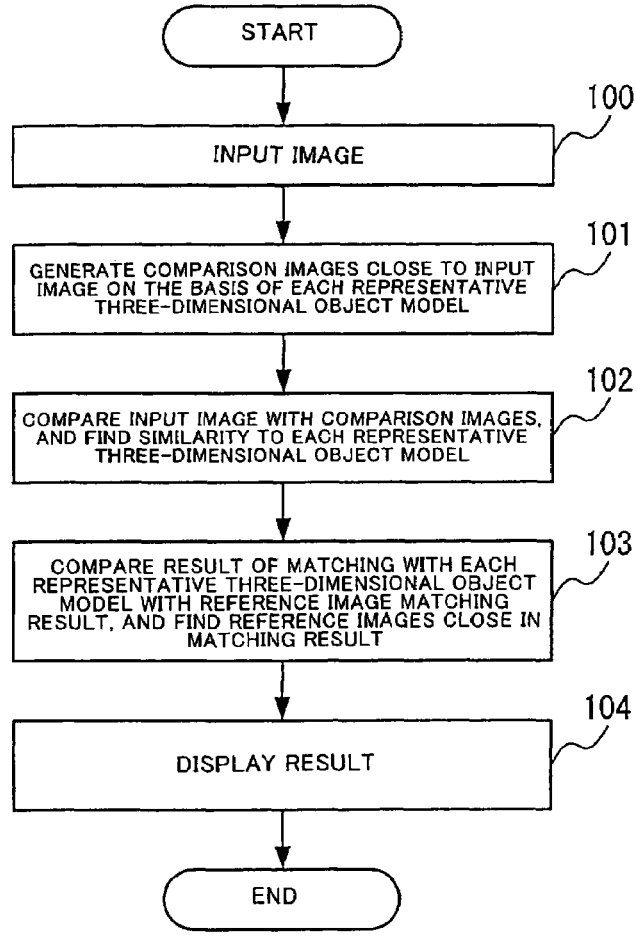
FIG. 2 is a flow char showing operation conducted at the time of matching in a first embodiment.

At the time of input image matching, an input image is first obtained by the input image section 10 (step 100 in FIG. 2). Subsequently, the image generation section 30 generates comparison images that are close in the input condition such as the pose and illumination to the input image, i.e., comparison images that facilitate comparison, with respect to each of the representative three-dimensional object models stored in the representative three-dimensional object model storage section 20 (step 101).

The image matching section 40 finds similarity between the input image and each of the comparison images (step 102). The result matching section 60 calculates a similarity between the matching result and a matching result of each of the reference image stored in the reference image matching result storage section 50, and extracts reference images having similar matching results, in the descending order of the similarity (step 103). Finally, a reference image having high similarity is displayed (step 104).

Effects of the first embodiment which has the configuration and which operates as described above will now be described.

The first embodiment has the configuration in which reference images are retrieved by comparing a result of matching between the input image and the representative three-dimensional object models with a result of matching between reference images and the representative three-dimensional object models. Even when only one reference image or a small number of reference images are present every object, therefore, reference images can be retrieved with respect to an input image of an object picked up under a different condition concerning the pose and illumination.

The present embodiment has a configuration in which image matching is conducted by conducting matching with representative three-dimensional object models which are less than objects and conducting similarity calculation on the results of the matching. This makes fast retrieval possible. Since the time taken for the similarity calculation of matching results is shorter than the time taken for the image matching, the retrieval time depends on the number of image matching operations. For example, if the number N of the representative three-dimensional object models is N=M/100 where M is the number of objects (the number of reference images), then the number of required image matching operations is L×N=L× M/100 where L is the number of comparison images for each representative three-dimensional object model generated in the image generation section 30. Thus, retrieval can be conducted with the number of times of matching as small as 1/100 of that in the conventional technique.

Operation of the first embodiment will now be described with reference to FIGS. 3 to 8 which show concrete embodiments.

Figure 3:
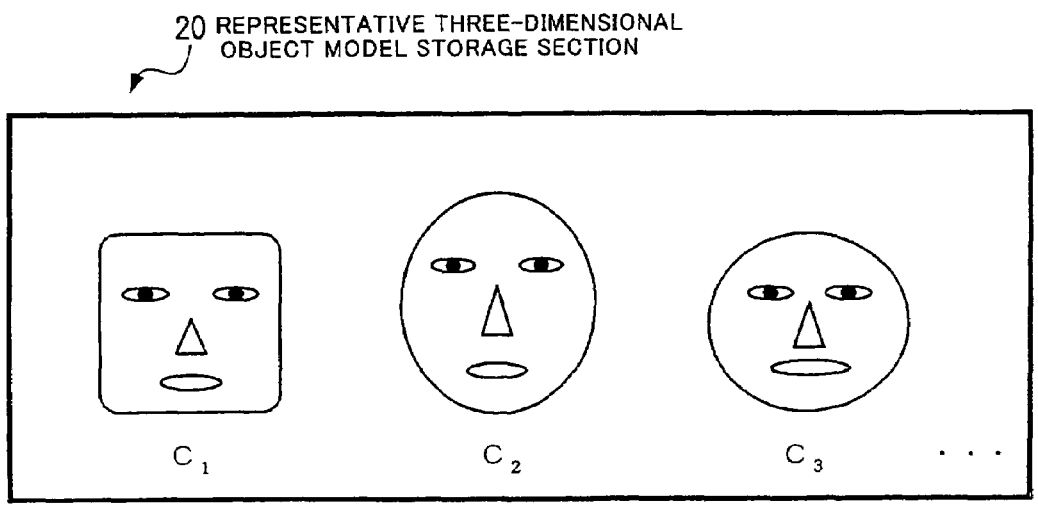
FIG. 3 is a diagram showing a concrete example of a representative three-dimensional object model in a first embodiment.
Figures 4, 5:
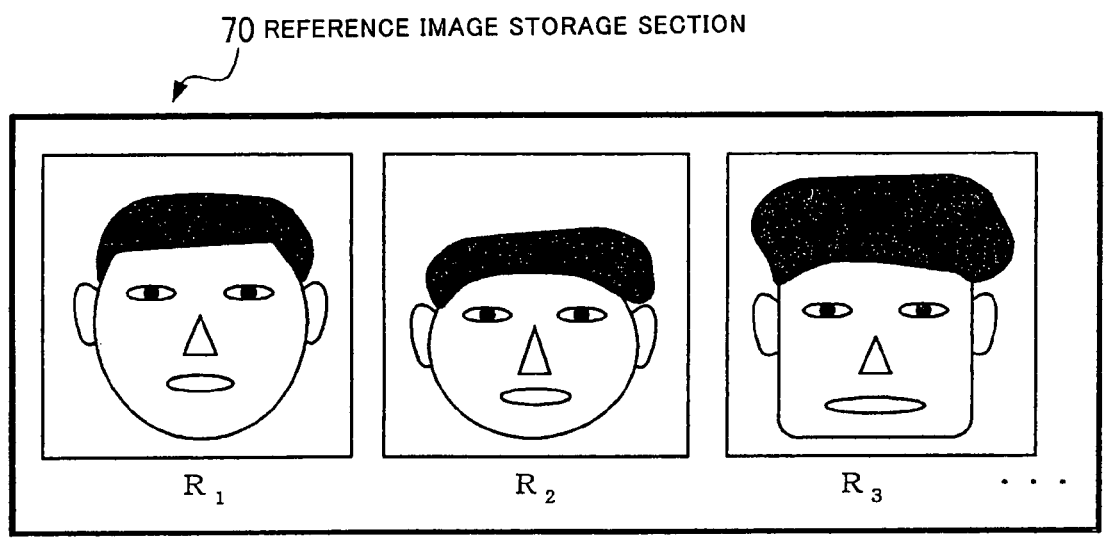
FIG. 4 is a diagram showing concrete examples of a reference image in a first embodiment.
FIG. 5 is a diagram showing a concrete example of a reference image matching result in a first embodiment.

As shown in FIG. 3, N representative three-dimensional object models $C_j$ (j=1, 2, . . . , N) are stored in the representative three-dimensional object model storage section 20. As shown in FIG. 4, M reference images $R_i$ (i=1, 2, . . . , M) respectively of the objects are stored in the reference image storage section 70 (A plurality of reference images may be present for each of the objects. In the ensuing description, however, it is supposed that one reference image is stored every object).

As shown in FIG. 5, a result (similarity $S_{ij}$) of matching of each of the reference images $R_i$ with the representative three-dimensional object model $C_j$ is stored in the reference image matching result storage section 50 by processing at the time of reference image registration. (In FIG. 5, the matching results are shown in the descending order of the similarity. As a matter of fact, however, the matching results may be stored in the order of model.)

Figures 6, 7, 8:
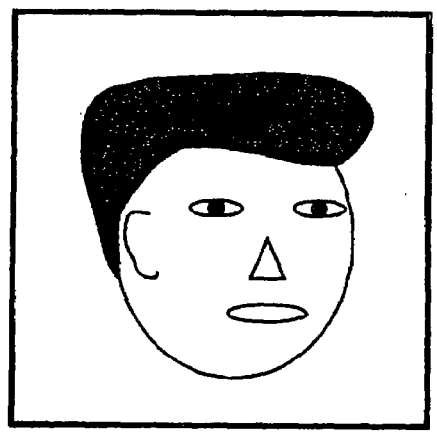
FIG. 6 is a diagram showing a concrete example of an input image in a first embodiment.
FIG. 7 is a diagram showing a concrete example of an input image matching result in a first embodiment.
FIG. 8 is a diagram showing a concrete example of result matching in a first embodiment.

It is supposed that an input image I(u, v) as shown in FIG. 6 is obtained by the image input section 10 at the time of matching of the input image (step 100 in FIG. 2). Subsequently, the image generation section 30 generates L comparison images $G_{jk}$(u, v) (j=, N, k=1, . . . , L) which are close in input condition such as the pose and illumination to the input image, with respect to each of the representative three-dimensional object models $C_j$ (j=1, . . . , N) in the representative three-dimensional object model storage section 20 (step 101).

In addition, the image matching section 40 finds a similarity S(I, $G_{jk}$) between the input image I(u, v) and each of the comparison images $G_{jk}$(u, v), and finds a maximum similarity $S_{0j}$=$\max_k$S(I, $G_{jk}$) every representative three-dimensional object model (step 102). The matching results (similarities) $S_{0j}$ become, for example, as shown in FIG. 7.

The result matching section 60 calculates a similarity $D_i$=D($S_{0j}$, $S_{ij}$) between the matching result $S_{0j}$ and the matching result $S_{ij}$ of each of the reference images in the reference image matching result storage section 50, and extracts reference images in the descending order of the similarity $D_i$ of the matching result (step 103). The result of the extraction becomes, for example, as shown in FIG. 8. As reference images having a high possibility of being an image of the same object as the input image, $R_1$, $R_5$ and $R_2$ are obtained in the cited order. Finally, the reference images having high similarities are displayed (step 104).

As the calculation method of the similarity $D_t(S_{0j}, S_{ij})$ of the matching result, normalized correlation, rank correlation, or the like can be used. The rank correlation is correlation of candidate precedence of the matching result. Denoting the candidate precedence of the matching result $S_{0j}$ of the input image by $A_{0j}$, it follows that $A_{0.2}=1, A_{0.5}=2$ and $A_{0.3}=3$ in the case of the matching result shown in FIG. 7. Denoting candidate precedence of the matching result $S_{ij}$ of each of the reference images by $A_{ij}$, for example, the Spearman's rank correlation can be obtained according to the expression $1-6\Sigma_j (A_{0j}-A_{ij})^2/\{N(N^2-1)\}$.

In the similarity calculation, the similarities may be calculated after conducting variable conversion on the variables (such as $S_{0j}, S_{ij}$ and $A_{0j}, A_{ij}$). The similarities may be calculated by weighting variables with weights $g(A_{0j}, A_{ij})$ based on the candidate precedence $A_{0j}$ and/or $A_{ij}$. For example, specific gravities of high precedence candidates become great by setting $g(A_{0j}, A_{ij})=1/(A_{0j}+A_{ij})$ and replacing the similarities $S_{0j}$ and $S_{ij}$ respectively by $S_{0j}/(A_{0j}+A_{ij})$ and $S_{ij}/(A_{0j}+A_{ij})$. The similarities may be calculated with low precedence candidates excluded.

An image matching system according to a second embodiment of the present invention will now be described with reference to FIGS. 9 to 15. An image matching system according to the second embodiment of the present invention includes an image input section 10, an image generation section 30, an image matching section 40, a result matching section 60, a result display section 80, a reference image storage section 70, a reference image registration section 75, a representative three-dimensional object model storage section 20, a three-dimensional object model registration section 25, a reference image matching result storage section 50, and a reference image matching result update section 55. This configuration is obtained by adding the reference image registration section 75, the three-dimensional object model registration section 25, and the reference image matching result update section 55 to the configuration of the first embodiment.

As to components in the image matching system according to the second embodiment that are the same as those in the first embodiment, description will be omitted. The components added in the present embodiment will be described.

The three-dimensional object model registration section 25 registers a new representative three-dimensional object model (a three-dimensional shape of an object and a texture on the object surface) in the representative three-dimensional object model storage section 20.

When at the time of registration a representative three-dimensional object model is registered in the representative three-dimensional object model storage section 20 by the three-dimensional object model 25, and when a reference image is registered in the reference image storage section 70 by the reference image registration section 75, the reference image matching result update section 55 conducts matching operation on a combination of a new reference image and a representative three-dimensional object model by using the image generation section 30 and the image matching section 40, and adds a result of the matching to data in the reference image matching result storage section 50.

The reference image registration section 75 registers reference images which are two-dimensional images of an object to be retrieved, in the reference image storage section 70. As for the reference images, there are no restrictions to the input condition including the illumination and pose. At least one image is registered every object (retrieval subject).

Figure 28:
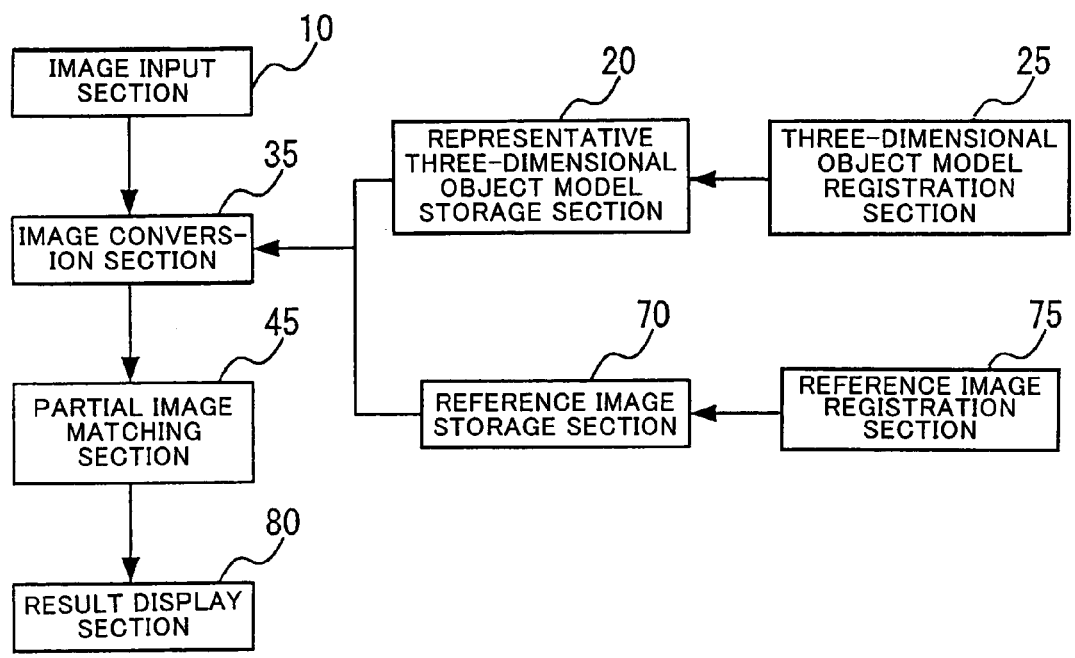
FIG. 28 is a block diagram showing a configuration of an image matching system according to a second conventional technique.

By the way, the three-dimensional object model registration section 25 is the same as the three-dimensional object model registration section 25 in the second conventional technique shown in FIG. 28. Representative three-dimensional object models obtained from the three-dimensional object model registration section 25 are previously stored in the representative three-dimensional object model storage section 20.

General operation of the second embodiment will now be described in detail with reference to FIG. 9 and flow charts shown in FIGS. 2, 10 and 11.

Operation conducted at the time of matching of the input image is completely the same as the operation of the first embodiment shown in FIG. 2.

At the time of input image matching, an input image is first obtained by the input image section 10 (step 100 in FIG. 2). Subsequently, the image generation section 30 generates comparison images that are close in the input condition such as the pose and illumination to the input image, i.e., comparison images that facilitate comparison, with respect to each of the representative three-dimensional object models stored in the representative three-dimensional object model storage section 20 (step 101).

The image matching section 40 finds a similarity between the input image and each of the comparison images (step 102). The result matching section 60 calculates a similarity between the matching result and the matching result of each of the reference images stored in the reference image matching result storage section 50, and extracts reference images having similar matching results, in the descending order of the similarity (step 103). Finally, a reference image having high similarity is displayed (step 104).

Operation conducted at the time of representative three-dimensional object model registration and operation conducted at the time of reference image registration will now be described.

At the time of representative three-dimensional object model (a three-dimensional shape of an object and a texture on the object surface) registration, the three-dimensional object model registration section 25 first registers a new representative three-dimensional object model in the representative three-dimensional object model storage section 20 (step 200 in FIG. 10).

Subsequently, the reference image matching result update section 55 sends each of the reference images stored in the reference image storage section 70 to the image input section 10 as the input image. The reference image matching result update section 55 conducts matching, in the image matching section 40, of each of the reference images with comparison images generated by the image generation section 30 on the basis of the registered representative three-dimensional object model, and finds a similarity (step 201). Finally, the reference image matching result update section 55 adds a result of the matching to each of the matching results of the reference images stored in the reference image matching result storage section 50 (step 202).

At the time of reference image registration, the reference image registration section 75 first registers a new reference image in the reference image storage section 70 (step 210 in FIG. 11).

Subsequently, the reference image matching result update section 55 sends the reference image registered in the reference image storage section 70 to the image input section 10 as the input image. The reference image matching result update section 55 conducts matching, in the image matching section 40, of the reference image with comparison images generated by the image generation section 30 on the basis of the representative three-dimensional object model stored in the representative three-dimensional object model storage section 20, and finds similarities (step 211). Finally, the reference image matching result update section 55 adds a result of the matching to the reference image matching result storage section 50 (step 212).

Effects of the second embodiment which has the configuration and which operates as described above will now be described.

The second embodiment has the configuration in which reference images are retrieved by comparing a result of matching between the input image and the representative three-dimensional object models with a result of matching between reference images and the representative three-dimensional object models. Even when only one reference image or a small number of reference images are present every object, therefore, reference images can be retrieved with respect to an input image of an object picked up under a different condition concerning the pose and illumination.

The present embodiment has a configuration in which image matching is conducted by conducting matching with representative three-dimensional object models which are less than objects and conducting similarity calculation on the results of the matching. This makes fast retrieval possible. Since the time taken for the similarity calculation of matching results is shorter than the time taken for the image matching, the retrieval time depends on the number of image matching operations. For example, if the number N of the representative three-dimensional object models is N=M/100 where M is the number of objects (the number of reference images), then the number of required image matching operations is L×N=L×M/100 where L is the number of comparison images for each representative three-dimensional object model generated in the image generation section 30. Thus, retrieval can be conducted with the number of times of matching as small as 1/100 of that in the conventional technique.

Operation of the second embodiment will now be described with reference to concrete embodiments.

As shown in FIG. 3, N representative three-dimensional object models $C_j$ (j=1, 2, . . . , N) are stored in the representative three-dimensional object model storage section 20 in the same way as the first embodiment. As shown in FIG. 4, M reference images $R_i$ (i=1, 2, . . . , M) of the objects are stored in the reference image storage section 70. As shown in FIG. 5, a result (similarity $S_{ij}$) of matching of each reference image $R_i$ with the representative three-dimensional object model $C_j$ is stored in the reference image matching result storage section 50 by processing at the time of reference image registration.

It is supposed that an input image I(u, v) as shown in FIG. 6 is obtained by the image input section 10 at the time of matching of the input image (step 100 in FIG. 2). Subsequently, the image generation section 30 generates L comparison images $G_{jk}(u, v)$ (j=1, . . . N, k=1, . . . , L) which are close in input condition such as the pose and illumination to the input image, with respect to each of the representative three-dimensional object models $C_j$ (j=1, . . . , N) in the representative three-dimensional object model storage section 20 (step 101).

In addition, the image matching section 40 finds a similarity $S(I, G_{jk})$ between the input image I(u, v) and each of the comparison images $G_{jk}(u, v)$, and finds a maximum similarity $S_{oj}=\max_k S(I, G_{jk})$ every representative three-dimensional object model (step 102). The matching results (similarities) $S_{oj}$ become, for example, as shown in FIG. 7.

The result matching section 60 calculates similarities $D_i=D(S_{oj}, S_{ij})$ between the matching result $S_{oj}$ and the matching results $S_{ij}$ of the reference images in the reference image matching result storage section 50, and extracts reference images in the descending order of the similarity $D_i$ of the matching result (step 103). The result of the extraction becomes, for example, as shown in FIG. 8. As reference images having a high possibility of being an image of the same object as the input image, $R_1$, $R_5$ and $R_2$ are obtained in the cited order. Finally, the reference images having high similarities are displayed (step 104).

At the time of representative three-dimensional object model registration, the three-dimensional object model registration section 25 first registers a new representative three-dimensional object model. If N=50 representative three-dimensional object models are already registered in the representative three-dimensional object model storage section 20, the three-dimensional object model registration section 25 registers a new fifty-first representative three-dimensional object model $C_{51}$ (step 200 in FIG. 10).

Subsequently, the reference image matching result update section 55 sends each reference image $R_i$ stored in the reference image storage section 70 to the image input section 10 as the input image. The reference image matching result update section 55 conducts matching of the each reference image $R_i$ with the registered representative three-dimensional object model $C_{51}$ by using the image generation section 30 and the image matching section 40, and finds each similarity $S_{i,51}=\max_k S(R_i, G_{51,k})$ (step 201).

The matching result (similarity) $S_{i,51}$ becomes, for example, as shown in FIG. 12. Finally, as shown in FIG. 13, the reference image matching result update section 55 adds the matching result to the matching results of each of the reference images stored in the reference image matching result storage section 50 (step 202).

At the time of reference image registration, the reference image registration section 75 first registers a new reference image in the reference image storage section 70. If M=100 reference images are already registered in the reference image storage section 70, the reference image registration section 75 registers a new hundred first reference image $R_{101}$ in the reference image storage section 70 (step 210 in FIG. 11).

Subsequently, the reference image matching result update section 55 sends the reference image $R_{101}$ registered in the reference image storage section 70 to the image input section 10 as the input image. The reference image matching result update section 55 conducts matching of the reference image $R_{101}$ with each three-dimensional object model $C_j$ stored in the representative three-dimensional object model storage section 20 by using the image generation section 30 and the image matching section 40, and finds each similarity $S_{101,j}=\max_k S(R_{101}, G_{jk})$ (step 211).

The matching result (similarity) becomes, for example, as shown in FIG. 14. Finally, the reference image matching result update section 55 adds the matching result to the reference image matching result storage section 50 (step 212).

An image matching system according to a third embodiment of the present invention will now be described in detail with reference to FIGS. 16 to 19.

Figure 16:
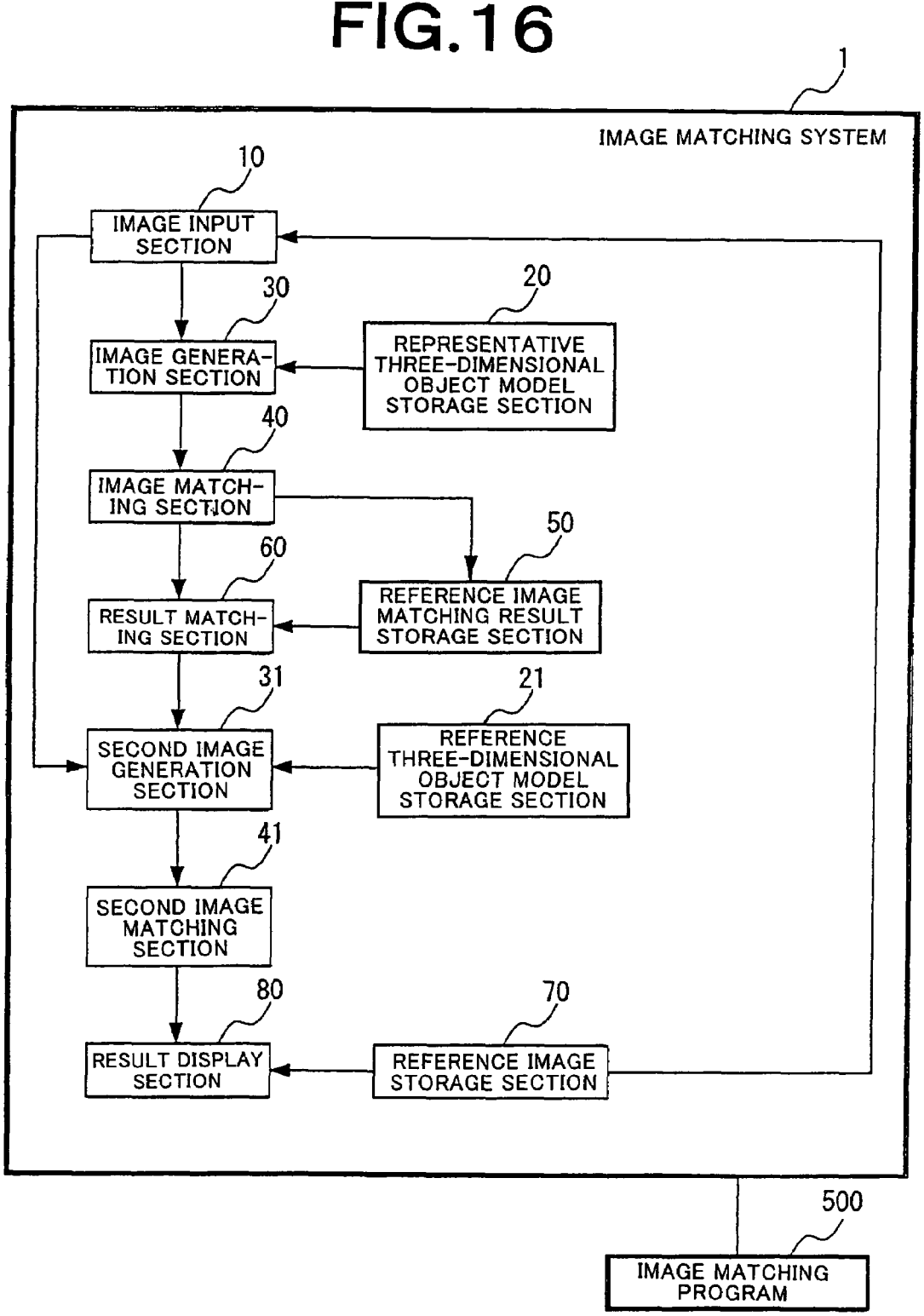
FIG. 16 is a block diagram showing a configuration of an image matching system according to a third embodiment of the present invention.

With reference to FIG. 16, an image matching system according to the third embodiment of the present invention includes an image input section 10, an image generation section 30, an image matching section 40, a result matching section 60, a second image generation section 31, a second image matching section 41, a result display section 80, a reference image storage section 70, a representative three-dimensional object model storage section 20, a reference image matching result storage section 50, and a reference three-dimensional object model storage section 21.

These components nearly operate as described below. The image input section 10, the image generation section 30, the image matching section 40, the result matching section 60, the result display section 80, the reference image storage section 70, and the representative three-dimensional object model storage section 20 conduct the same processing as the processing conducted in the first embodiment of the present invention shown in FIG. 1.

Reference three-dimensional object models associated with the reference image are previously stored in the reference three-dimensional object model storage section 21. The reference three-dimensional object models can be generated by combining representative three-dimensional object models stored in the representative three-dimensional object model storage section 20 on the basis of information concerning the reference image matching result registered in the reference image matching result storage section 50. Or if three-dimensional object models of the same object as the reference image are previously generated by a three-dimensional shape measurement apparatus in the same way as the above-described representative three-dimensional object model registration, the three-dimensional object models may be used.

The second image generation section 31 generates comparison images that are close in input condition such as the pose and illumination condition to the input image obtained from the image input section 10, for a reference image that is a high precedence candidate in the matching results obtained from the result matching section 60, on the basis of each of the reference three-dimensional object model associated with the reference image obtained from the reference three-dimensional object model storage section 21.

The second image matching section 41 compares the input image obtained from the image input section 10 with each of the comparison images obtained from the second image generation section 31, and calculates each similarity.

General operation of the third embodiment will now be described in detail with reference to FIG. 16 and a flow chart shown in FIG. 17.

Figure 17:
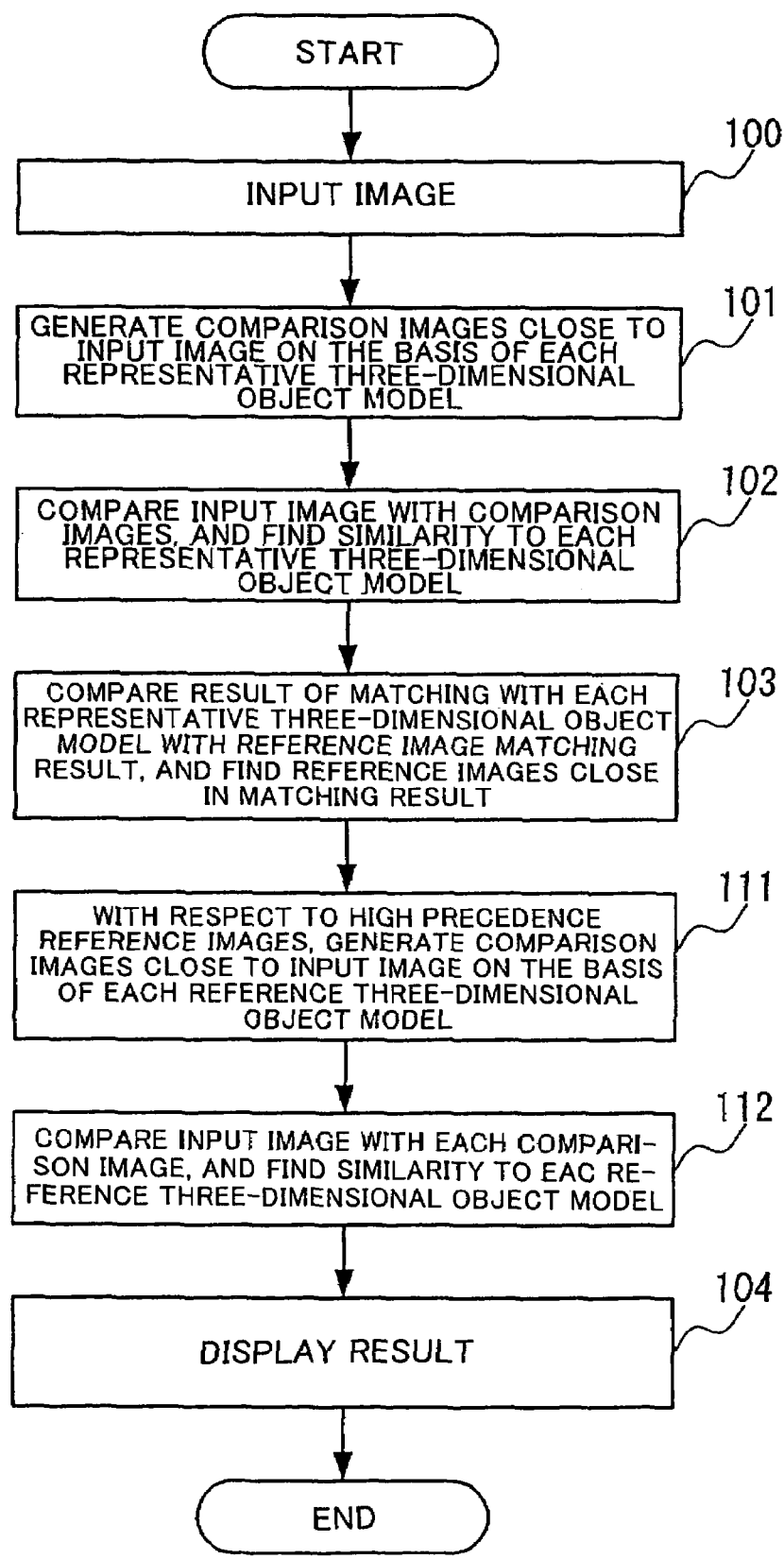
FIG. 17 is a flow chart showing operation conducted at the time of matching in a third embodiment.

At the time of input image matching, steps 100, 101, 102 and 103 shown in FIG. 17 are the same as the operation conducted in the first embodiment shown in FIG. 2.

The second image generation section 31 generates comparison images that are close in input condition such as the pose and illumination condition to the input image obtained from the image input section, for a reference image that is a high precedence candidate in the matching results obtained from the result matching section 60, on the basis of each of the reference three-dimensional object model associated with the reference image obtained from the reference three-dimensional object model storage section 21 (step 111).

The second image matching section 41 compares the input image obtained from the image input section with each of the comparison images obtained from the second image generation section 31, and calculates each similarity (step 112). Finally, the reference image having high similarity is displayed (step 104).

Effects of the third embodiment which has the configuration and which operates as described above will now be described.

The third embodiment has the configuration in which the reference three-dimensional object model generated by combining representative three-dimensional object models is matched. Even when only one reference image is present every object, therefore, reference images can be retrieved by using the reference three-dimensional object models, with respect to an input image of an object picked up under a different condition concerning the pose and illumination.

The present embodiment has a configuration in which reference images having high similarity are extracted by using a representative three-dimensional object model and then matching of the reference three-dimensional object model with high precedence candidates is conducted. As a result, reference images can be retrieved at high speed.

Operation of the third embodiment will now be described with reference to concrete embodiments.

In the same way as the operation of the first embodiment, representative three-dimensional object models $C_j$ (j=1, 2, ..., N) as shown in FIG. 3 are stored in the representative three-dimensional object model storage section 20. Reference images $R_i$ (i=1, 2, ..., M) respectively of the objects as shown in FIG. 4 are stored in the reference image storage section 70. A result (similarity) $S_{ij}$ of matching of each of the reference images $R_i$ with the representative three-dimensional object model $C_j$ as shown in FIG. 5 is stored in the reference image matching result storage section 50.

Figures 18, 19:
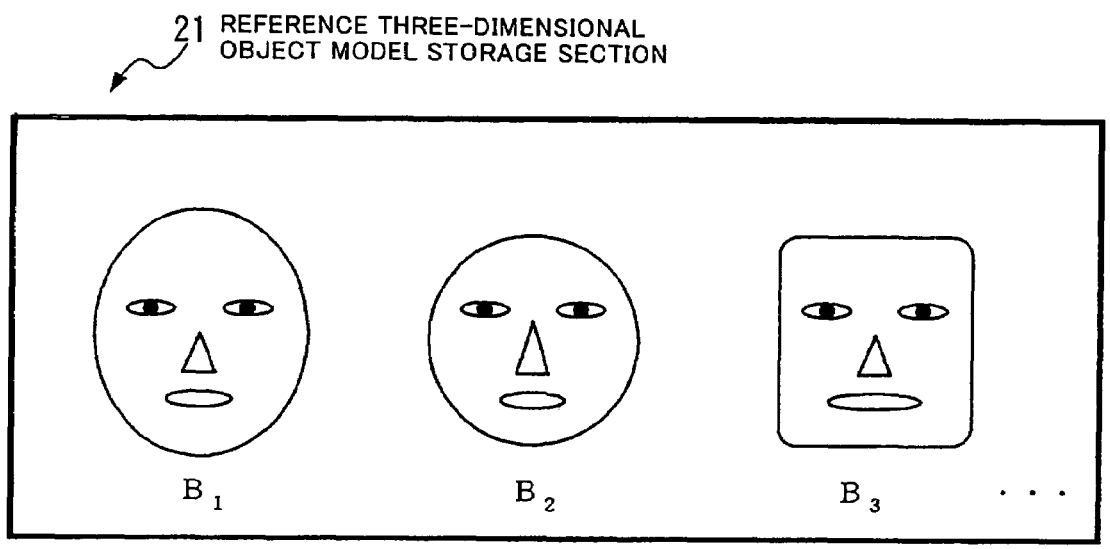
FIG. 18 is a diagram showing concrete examples of a reference three-dimensional object model in a third embodiment.
FIG. 19 is a diagram showing a concrete example of a reference image matching result in a third embodiment.

In addition, M reference three-dimensional object models Bi (i=1, 2, ..., M) associated with the reference image $R_i$ are previously stored in the reference three-dimensional object model storage section 21 as shown in FIG. 18.

It is supposed that an input image I(u, v) as shown in FIG. 6 is obtained by the image input section 10 at the time of matching of the input image (step 100 in FIG. 17). According to the same processing as the operation in the first embodiment, $R_1$, $R_5$ and $R_2$ are obtained in the cited order as reference images having a high possibility of being an image of the same object as the input image as shown in FIG. 8 by the image generation section 30, the image matching section 40, and the result matching section 60 (steps 101, 102 and 103).

With respect to, for example, the reference images $R_1$, $R_5$ and $R_2$ which are three high precedence candidates in the matching result obtained from the result matching section 60, the second image generation section 31 acquires associated reference three-dimensional object models $B_1$, $B_5$ and $B_2$ from the reference three-dimensional object model storage section 21, and generates comparison images $H_{jk}(u, v)$ (j=1, 5, 2, k=1, ..., L) which are close in input condition such as the pose and illumination to the input image obtained from the image input section 10 (step 111). The generation of the comparison images Hjk(u, v) is conducted by using a method similar to the step 101. In other words, the second image generation section 31 generates L comparison images Hjk(u, v) (j=1, 5, 2, k=1, ..., L) which are close in input condition such as the pose and illumination to the input image, with respect to the reference three-dimensional object models Bj (j = 1, 5, 2) in the reference three-dimensional object model storage section 21. The second image matching section 41 finds a similarity S(I, Hjk) between the input image I(u, v) and each comparison image Hjk(u, v), and finds a maximum similarity Soj=maxk S(I, Hjk) every model (step 112).

The matching results become, for example, as shown in FIG. 19. If $S_{0.5} > S_{0.1} > S_{0.2}$, then $R_5$, $R_1$ and $R_2$ are obtained in the cited order as reference images having a high possibility of being an image of the same object as the input image. Finally, the reference images having high similarities are displayed (step 104).

An image matching system according to a fourth embodiment of the present invention will now be described in detail with reference to FIGS. 20 to 22.

Figure 20:
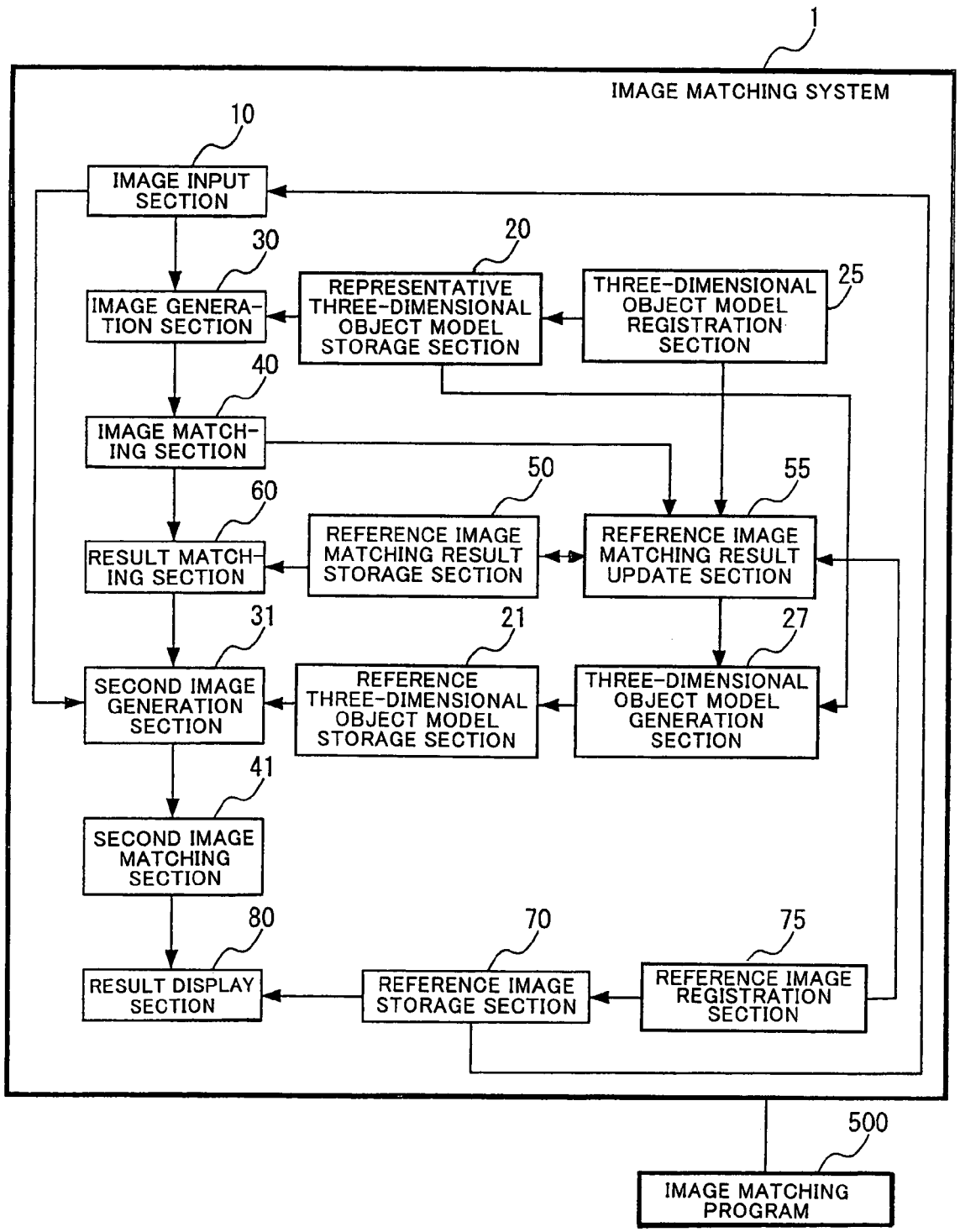
FIG. 20 is a block diagram showing a configuration of an image matching system according to a fourth embodiment of the present invention.

With reference to FIG. 20, an image matching system according to the fourth embodiment of the present invention includes an image input section 10, an image generation section 30, an image matching section 40, a result matching section 60, a second image generation section 31, a second image matching section 41, a result display section 80, a reference image storage section 70, a reference image registration section 75, a representative three-dimensional object model storage section 20, a three-dimensional object model registration section 25, a reference image matching result storage section 50, a reference image matching result update section 55, a reference three-dimensional object model storage section 21, and a three-dimensional object model generation section 27.

The fourth embodiment has a configuration obtained by adding the reference image registration section 75, the three-dimensional object model registration section 25, the reference image matching result update section 55 and the three-dimensional object model generation section to the configuration of the third embodiment.

As to components in the image matching system according to the fourth embodiment that are the same as those in the third embodiment, description will be omitted. The components added in the present embodiment will be described.

These components nearly operate as described below. The image input section 10, the image generation section 30, the image matching section 40, the result matching section 60, the result display section 80, the reference image storage section 70, the reference image registration section 75, the representative three-dimensional object model storage section 20, the three-dimensional object model registration section 25, and the reference image matching result update section 55 conduct the same processing as the processing conducted in the first embodiment of the present invention shown in FIG. 1 and the second embodiment shown in FIG. 9.

The reference three-dimensional object model storage section 21, the second image generation section 31, and the second image matching section 41 conduct the same processing as the processing conducted in the third embodiment shown in FIG. 16.

When at the time of registration a reference image matching result is registered in the reference image matching result storage section 50 by the reference image matching result update section 55, the three-dimensional object model generation section 27 generates a reference three-dimensional object model associated with the reference image by combining representative three-dimensional object models in the representative three-dimensional object model storage section 20 on the basis of information of the reference image matching result, and registers the reference three-dimensional object model in the reference three-dimensional object model storage section 21, or updates a reference three-dimensional object model in the reference three-dimensional object model storage section 21.

With respect to the reference images of high precedence candidates in the matching result obtained from the result matching section 60, the second image generation section 31 generates comparison images close in the input condition such as the pose and illumination condition to the input image obtained from the image input section 10, on the basis of each of the reference three-dimensional object models associated with the reference image obtained from the reference three-dimensional object model storage section 21.

The second image matching section 41 compares the input image obtained from the image input section 10 with each of the comparison images obtained from the second image generation section 31, and calculates each similarity.

General operation of the fourth embodiment will now be described in detail with reference to FIG. 20 and flow charts shown in FIGS. 17, 21 and 22.

At the time of matching of the input image, operation conducted at steps 100, 101, 102 and 103 in FIG. 17 is the same as that conducted in the first embodiment shown in FIG. 2.

The second image generation section 31 generates comparison images that are close in input condition such as the pose and illumination condition to the input image obtained from the image input section, for a reference image that is a high precedence candidate in the matching results obtained from the result matching section 60, on the basis of each of the reference three-dimensional object models associated with the reference image obtained from the reference three-dimensional object model storage section 21 (step 111).

The second image matching section 41 compares the input image obtained from the image input section with each of the comparison images obtained from the second image generation section 31, and calculates each similarity (step 112). Finally, the reference image having high similarity is displayed (step 104).

Figure 21:
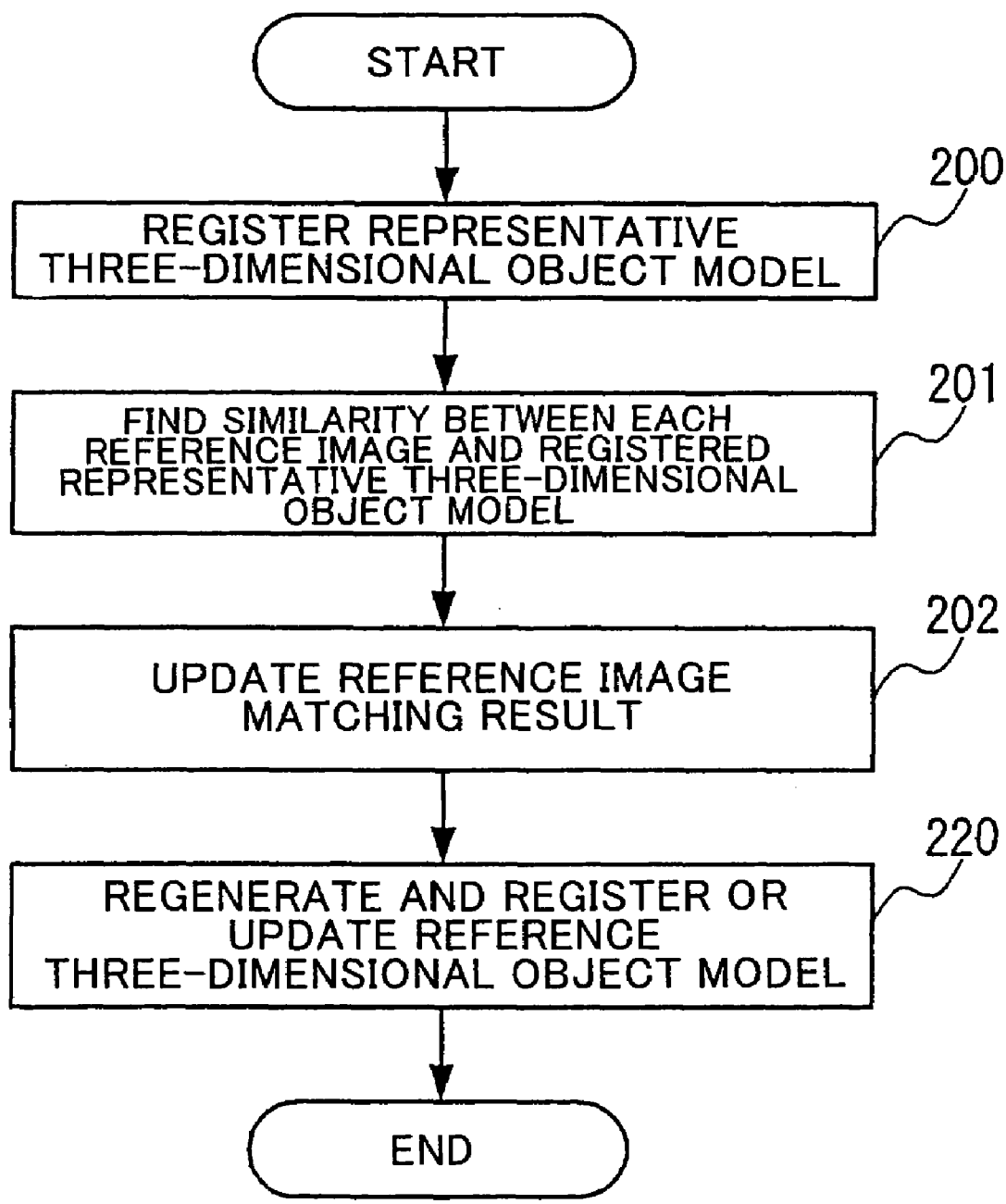
FIG. 21 is a flow chart showing operation conducted at the time of three-dimensional object model registration in a fourth embodiment.

At the time of three-dimensional object model registration, operation conducted at steps 200, 201 and 202 in FIG. 21 is the same as that conducted in the second embodiment shown in FIG. 10. Finally, the three-dimensional object model generation section 27 regenerates a reference three-dimensional object model associated with each reference image by combining representative three-dimensional object models in the representative three-dimensional object model storage section 20 on the basis of information of each reference image matching result in the reference image matching result storage section 50, and registers the reference three-dimensional object model in the reference three-dimensional object model storage section 21, or replaces a stored reference three-dimensional object model by it (step 220).

Figure 22:
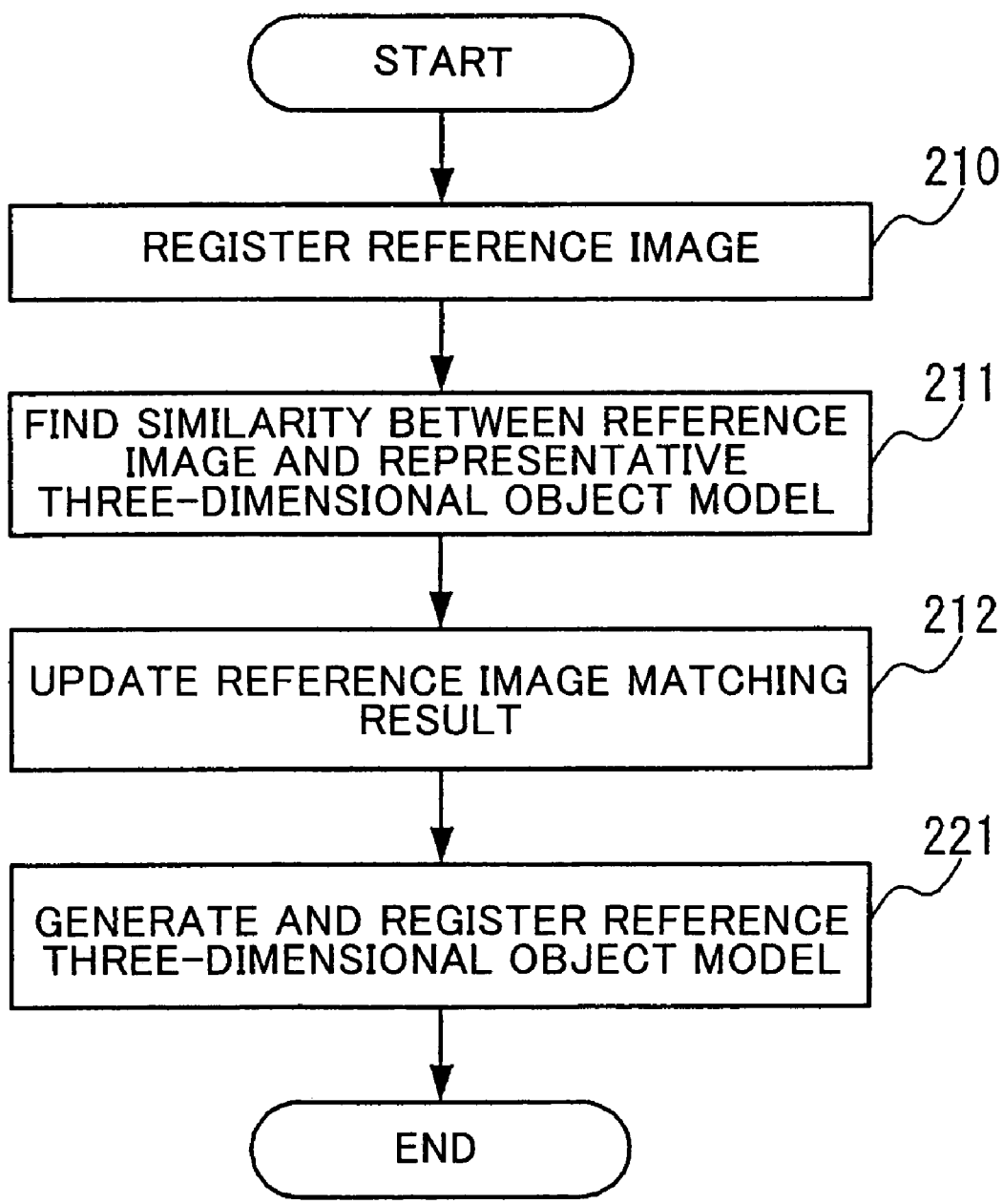
FIG. 22 is a flow chart showing operation conducted at the time of reference image registration in a fourth embodiment.

At the time of reference image registration, operation conducted at steps 210, 211 and 212 in FIG. 22 is the same as that conducted in the second embodiment shown in FIG. 11. Finally, the three-dimensional object model generation section 27 generates a reference three-dimensional object model associated with the reference image by combining representative three-dimensional object models in the representative three-dimensional object model storage section 20 on the basis of information of the reference image matching result newly registered in the reference image matching result storage section 50, and additionally registers the reference three-dimensional object model in the reference three-dimensional object model storage section 21 (step 221).

Effects of the fourth embodiment which has the configuration and which operates as described above will now be described.

The fourth embodiment has the configuration in which the reference three-dimensional object model generated by combining representative three-dimensional object models is matched. Even when only one reference image is present every object, therefore, reference images can be retrieved by using the reference three-dimensional object models, with respect to an input image of an object picked up under a different condition concerning the pose and illumination.

The present embodiment has a configuration in which reference images having high similarity are extracted by using a representative three-dimensional object model and then matching of the reference three-dimensional object model with high precedence candidates is conducted. As a result, reference images can be retrieved at high speed.

Operation of the fourth embodiment will now be described with reference to concrete embodiments.

In the same way as the operation of the first embodiment, representative three-dimensional object models $C_j$ (j=1, 2, . . . , N) as shown in FIG. 3 are stored in the representative three-dimensional object model storage section 20. Reference images $R_i$ (i=1, 2, . . . , M) respectively of the objects as shown in FIG. 4 are stored in the reference image storage section 70. A result (similarity) $S_{ij}$ of matching of each reference image $R_i$ with the representative three-dimensional object model $C_j$ as shown in FIG. 5 is stored in the reference image matching result storage section 50.

In addition, M reference three-dimensional object models Bi (i=1, 2, . . . , M) associated with the reference image $R_i$ are previously stored in the reference three-dimensional object model storage section 21 by the processing conducted at the time of reference image registration, as shown in FIG. 18.

It is supposed that an input image I(u, v) as shown in FIG. 6 is obtained by the image input section 10 at the time of matching of the input image (step 100 in FIG 17). According to the same processing as the operation in the first embodiment, $R_1$, $R_5$ and $R_2$ are obtained in the cited order as reference images having a high possibility of being an image of the same object as the input image as shown in FIG. 8 by the image generation section 30, the image matching section 40, and the result matching section 60 (steps 101, 102 and 103).

With respect to, for example, the reference images $R_1$, $R_5$ and $R_2$ which are three high precedence candidates in the matching result obtained from the result matching section 60, the second image generation section 31 acquires associated reference three-dimensional object models $B_1$, $B_5$ and $B_2$ from the reference three-dimensional object model storage section 21, and generates comparison images $H_{jk}(u, v)$ (j=1, 5, 2, k=1, . . . , L) which are close in input condition such as the pose and illumination to the input image obtained from the image input section 10 (step 111). The second image matching section 41 finds a similarity $S(I, H_{jk})$ between the input image I(u, v) and each comparison image $H_{jk}(u, v)$, and finds a maximum similarity $S_{oj}=\max_k S(I, H_{jk})$ every model (step 112).

The matching results become, for example, as shown in FIG. 19, and $R_5$, $R_1$ and $R_2$ are obtained in the cited order as reference images having a high possibility of being an image of the same object as the input image. Finally, the reference images having high similarity are displayed (step 104).

At the time of three-dimensional object model registration, the three-dimensional object model registration section 25 first registers a new representative three-dimensional object model in the representative three-dimensional object model storage section 20. If N=50 three-dimensional object models are already registered in the representative three-dimensional object model storage section 20, the three-dimensional object model registration section 25 registers a new fifty-first representative three-dimensional object model $C_{51}$ (step 200 in FIG. 21).

Subsequently, by the same processing as the operation in the second embodiment, the reference image matching result update section 55 updates the matching result $S_{ij}$ of each reference image in the reference image matching result storage section 50 (steps 201 and 202).

Finally, the three-dimensional object model generation section 27 regenerates a reference three-dimensional object model $B_i$ associated with each reference image $R_i$ (i=1, 2, . . . , M) by combining representative three-dimensional object models $C_j$ in the representative three-dimensional object model storage section 20 on the basis of information of each reference image matching result $S_{ij}$ in the reference image matching result storage section 50, and replaces the reference three-dimensional object model already stored in the reference three-dimensional object model storage section 21 by the reference three-dimensional object model $B_i$ (step 220).

Denoting the shape and texture of the representative three-dimensional object model $C_j$ (j=1, 2, . . . , N) respectively by $P_{Qj}(x, y, z)$ and $T_{Qj}(R, G, B)$ and denoting the shape and texture of the reference three-dimensional object model $B_i$ (i=1, 2, . . . , M) respectively by $P_{Qi}(x, y, z)$ and $T_{Qi}(R, G, B)$, the reference three-dimensional object model is calculated according to, for example, the following expressions.

$$P_{Qi}(x,y,z)=\Sigma_j f(S_{ij})P_{Qj}(x,y,z)$$

$$T_{Qi}(R,G,B)=\Sigma_j f(S_{ij})T_{Qj}(R,G,B)$$

Here, f is a function that monotonously increases as $S_{ij}$ increases, and that satisfies the relation $\Sigma_j f(S_{ij})=1$. As the simplest example, f can be implemented by $f(S_{ij})=S_{ij}/\Sigma_j S_{ij}$.

At the time of reference image registration, the reference image registration section 75 first registers a new reference image in the reference image storage section 70. If M=100 reference images are already registered in the reference image storage section 70, the reference image registration section 75 registers a new hundred first reference image $R_{101}$ in the reference image storage section 70 (step 210 in FIG. 22).

Subsequently, the reference image matching result update section 55 adds a matching result $S_{101,j}$ associated with the reference image $R_{101}$ to the reference image matching result storage section 50 by conducting the same processing as the operation in the second embodiment (steps 211 and 212).

Finally, the three-dimensional object model generation section 27 generates a reference three-dimensional object model $B_{101}$ associated with the reference image $R_{101}$ by combining representative three-dimensional object models $C_j$ in the representative three-dimensional object model storage section 20 on the basis of information of the reference image matching result $S_{101,j}$ in the reference image matching result storage section 50, and adds the reference three-dimensional object model $B_{101}$ to the reference three-dimensional object model storage section 21 (step 221).

An image matching system according to a fifth embodiment of the present invention will now be described in detail with reference to FIGS. 23 and 24.

Figure 23:
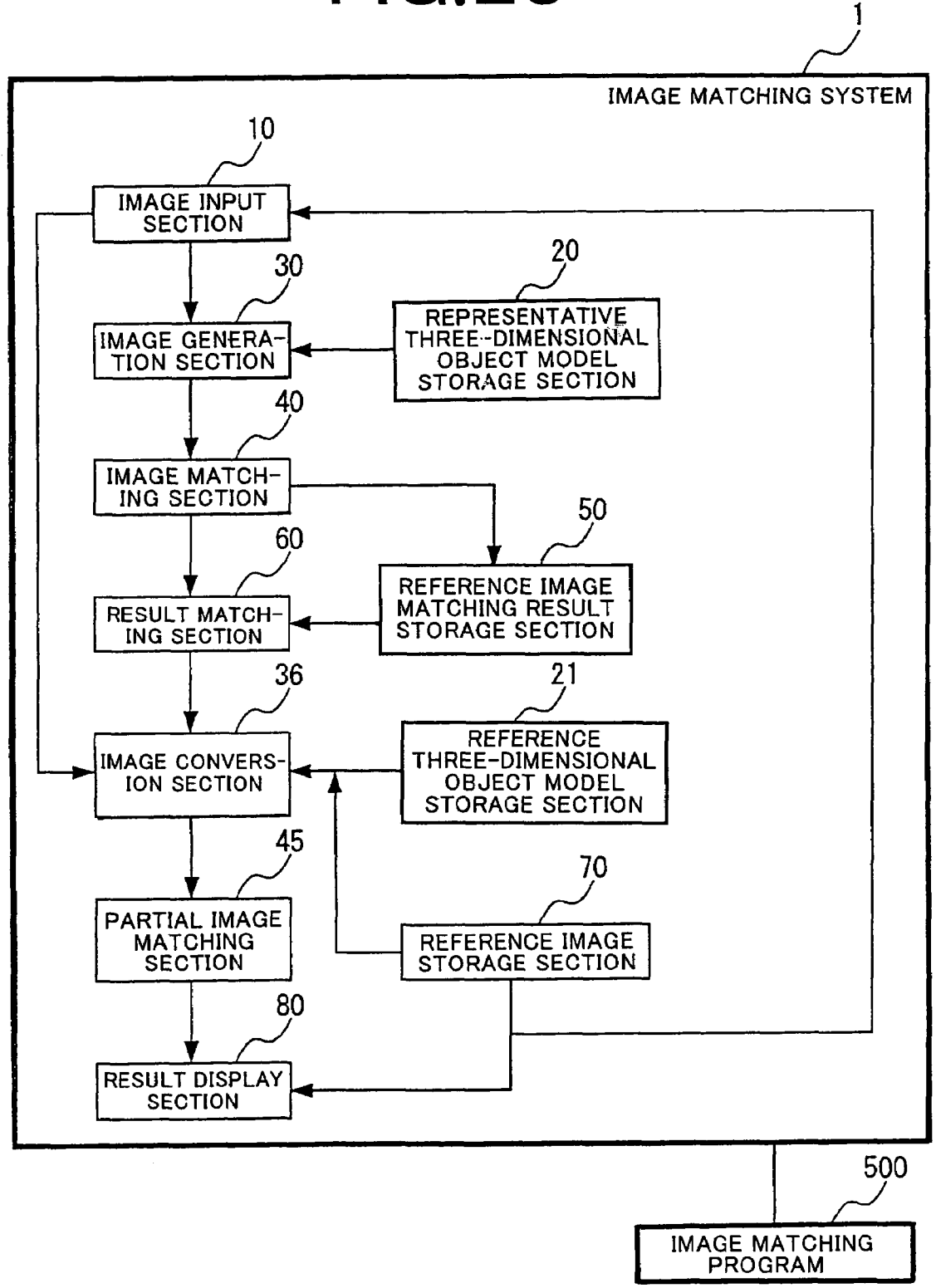
FIG. 23 is a block diagram showing a configuration of an image matching system according to a fifth embodiment of the present invention.

With reference to FIG. 23, an image matching system according to the fifth embodiment of the present invention includes an image input section 10, an image generation section 30, an image matching section 40, a result matching section 60, an image conversion section 36, a partial image matching section 45, a result display section 80, a reference image storage section 70, a representative three-dimensional object model storage section 20, a reference image matching result storage section 50, and a reference three-dimensional object model storage section 21.

These components nearly operate as described below. The image input section 10, the image generation section 30, the image matching section 40, the result matching section 60, the result display section 80, the reference image storage section 70, and the representative three-dimensional object model storage section 20 conduct the same processing as the processing conducted in the first embodiment of the present invention shown in FIG. 1.

With respect to a reference image of a high precedence candidate in the matching result obtained from the result obtained from the result matching section 60, the image conversion section 36 converts the input image and/or the reference image so as to make the input condition (such as the pose condition) the same on the basis of each reference three-dimensional object model associated with the reference image obtained from the reference three-dimensional object model storage section 21. Thus, the image conversion section 36 generates partial images. The image conversion section 36 is similar to the image conversion section 35 in the second conventional technique shown in FIG. 28.

The partial image matching section 45 conducts comparison on the partial images of the converted input image and reference image obtained from the image conversion section 36, and calculates the similarity. The similarity calculation is conducted in the same way as the step 102.

Figure 24:
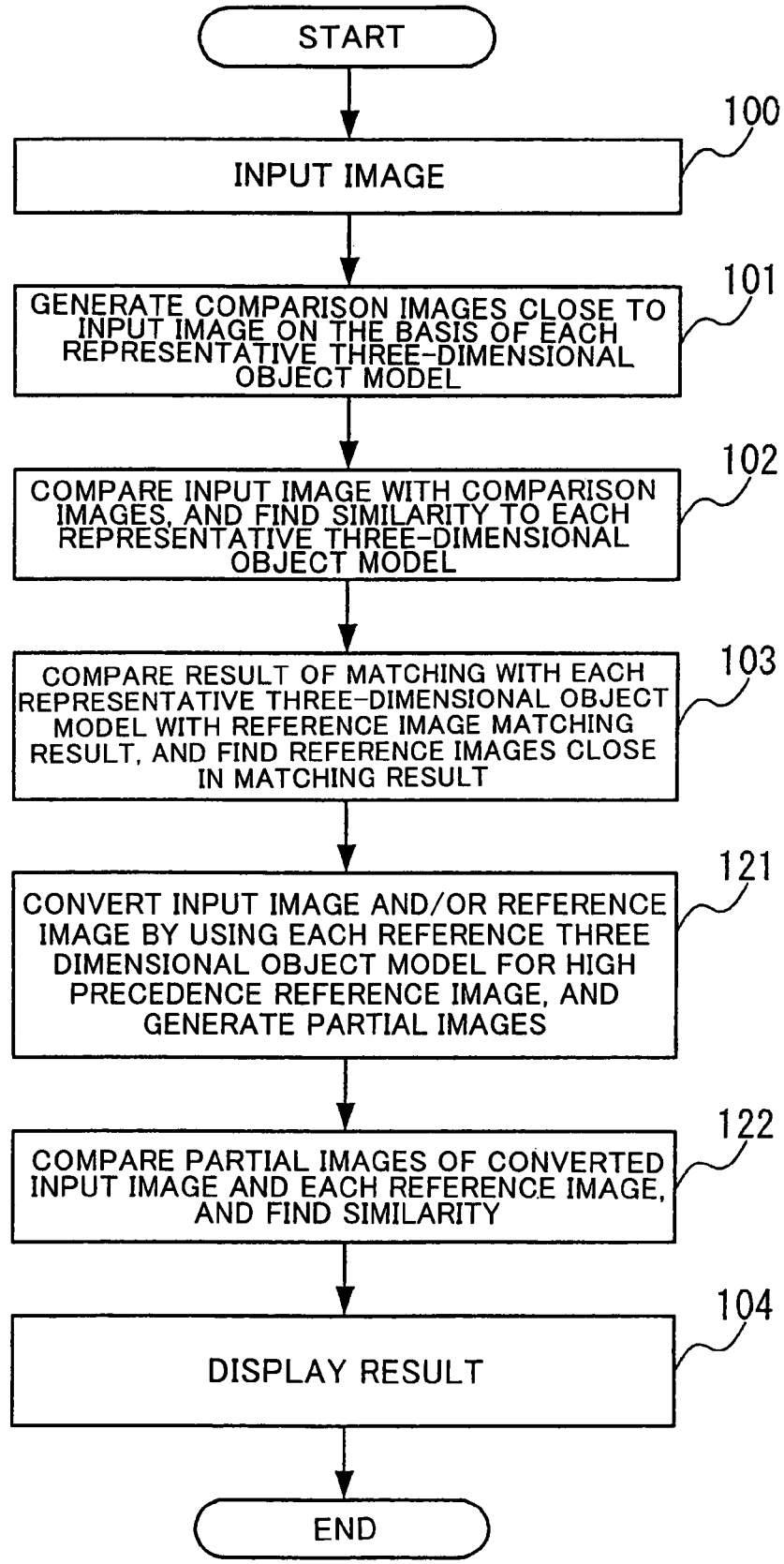
FIG. 24 is a flow chart showing operation conducted at the time of matching in a fifth embodiment.

At the time of input image matching, steps 100, 101, 102 and 103 shown in FIG. 24 are the same as the operation conducted in the first embodiment shown in FIG. 2. With respect to a reference image of a high precedence candidate in the matching result obtained from the result obtained from the result matching section 60, the image conversion section 36 converts the input image and/or the reference image so as to make the input condition (such as the pose condition) the same on the basis of each reference three-dimensional object model associated with the reference image obtained from the reference three-dimensional object model storage section 21. Thus, the image conversion section 36 generates partial images (step 121).

The partial image matching section 45 conducts comparison on the partial images of the converted input image and reference image obtained from the image conversion section 36, and calculates the similarity (step 122). Finally, the reference image having high similarity is displayed (step 104).

In the fifth embodiment of the present invention, the image conversion section 36 converts the input image and/or the reference image. Alternatively, the reference image may be previously converted to that under a standard input condition (for example, a standard pose condition) and stored, and the image conversion section 36 may convert the input image to that under the standard input condition (for example, the standard pose condition). By doing so, it becomes unnecessary to convert the reference image each time the matching is conducted, and the matching time can be shortened.

An image matching system according to a sixth embodiment of the present invention will now be described in detail with reference to FIG. 25.

Figure 25:
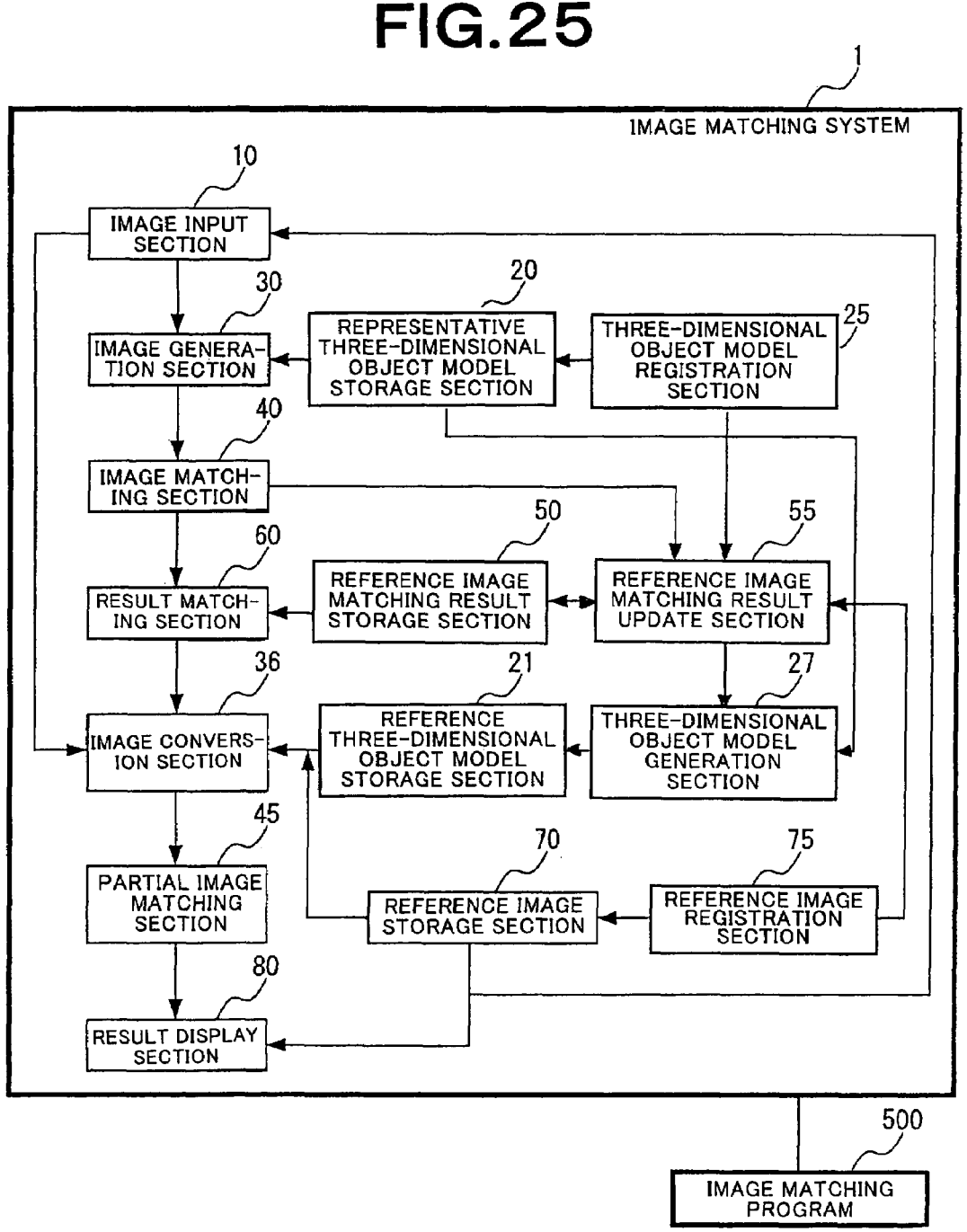
FIG. 25 is a block diagram showing a configuration of an image matching system according to a sixth embodiment of the present invention.
Figure 26:
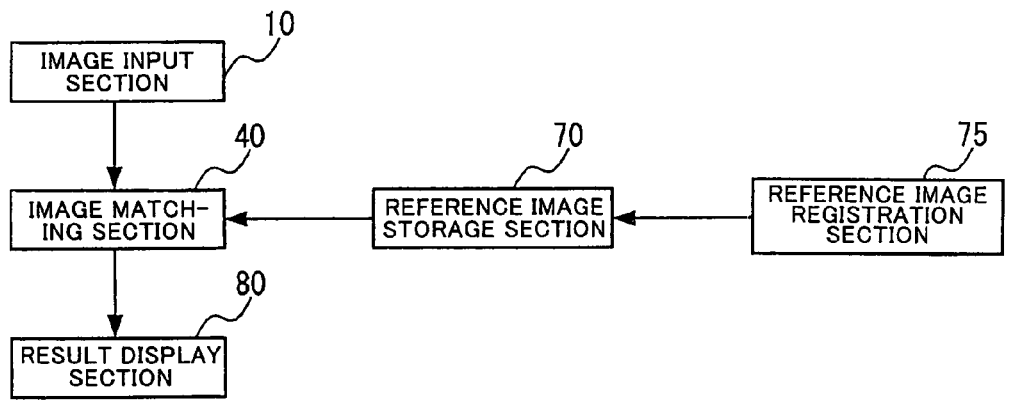
FIG. 26 is a block diagram showing a configuration of an image matching system according to a first conventional technique.

With reference to FIG. 25, an image matching system according to the sixth embodiment of the present invention includes an image input section 10, an image generation section 30, an image matching section 40, a result matching section 60, an image conversion section 36, a partial image matching section 45, a result display section 80, a reference image storage section 70, a reference image registration section 75, a representative three-dimensional object model storage section 20, a three-dimensional object model registration section 25, a reference image matching result storage section 50, a reference image matching result update section 55, a reference three-dimensional object model storage section 21, and a three-dimensional object model generation section 27.

These components nearly operate as described below. The image input section 10, the image generation section 30, the image matching section 40, the result matching section 60, the result display section 80, the reference image storage section 70, the reference image registration section 75, the representative three-dimensional object model storage section 20, the three-dimensional object model registration section 25, and the reference image matching result update section 55 conduct the same processing as the processing conducted in the first embodiment of the present invention shown in FIG. 1 and the second embodiment shown in FIG. 9.

The reference three-dimensional object model storage section 21 and the three-dimensional object model generation section 27 conduct the same processing as the processing conducted in the third embodiment shown in FIG. 16 and the fourth embodiment of the present invention shown in FIG. 20.

With respect to a reference image of a high precedence candidate in the matching result obtained from the result obtained from the result matching section 60, the image conversion section 36 converts the input image and/or the reference image so as to make the input condition (such as the pose condition) the same on the basis of each reference three-dimensional object model associated with the reference image obtained from the reference three-dimensional object model storage section 21. Thus, the image conversion section 36 generates partial images. The partial image matching section 45 conducts comparison on the partial images of the converted input image and reference image obtained from the image conversion section 36, and calculates the similarity.

General operation of the sixth embodiment will now be described in detail with reference to FIG. 25 and the flow chart shown in FIG. 24.

At the time of input image matching, steps 100, 101, 102 and 103 shown in FIG. 24 are the same as the operation conducted in the first embodiment shown in FIG. 2. With respect to a reference image of a high precedence candidate in the matching result obtained from the result obtained from the result matching section 60, the image conversion section 36 converts the input image and/or the reference image so as to make the input condition (such as the pose condition) the same on the basis of each reference three-dimensional object model associated with the reference image obtained from the reference three-dimensional object model storage section 21. Thus, the image conversion section 36 generates partial images (step 121).

The partial image matching section 45 conducts comparison on the partial images of the converted input image and reference image obtained from the image conversion section 36, and calculates the similarity (step 122). Finally, the reference image having high similarity is displayed (step 104).

In the sixth embodiment of the present invention, the image conversion section 36 converts the input image and/or the reference image. Alternatively, the reference image may be previously converted to that under a standard input condition (for example, a standard pose condition) and stored, and the image conversion section 36 may convert the input image to that under the standard input condition (for example, the standard pose condition).

When finding the similarity $S(I, G_{jk})$ between the input image $I(u, v)$ and each of the comparison images $G_{jk}(u, v)$ in the first to sixth embodiments of the present invention, the image matching section 40 finds one similarity $S(I, G_{jk})$ on the whole. Alternatively, the image matching section 40 may find similarity $S(I, G'_{jkm})$ every partial region m, and find a maximum similarity $S'_{0jm} = \max_k S(I, G'_{jkm})$ every model.

Figure 29:
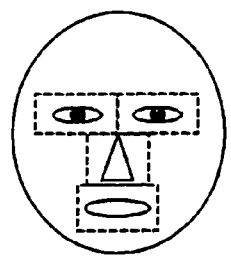
FIG. 29 is a diagram showing a concrete example of a partial region of a second conventional technique.

The partial regions are, for example, regions as shown in FIG. 29. In this case, similarity $S'_{ijm} = \max_k S(R_i, G'_{jkm})$ of each partial region m is stored in the reference image matching result storage section 50 as well. The result matching section 60 calculates a similarity $D_i = \Sigma_m D(S'_{0jm}, S'_{ijm})$ between the matching result $S'_{0jm}$ and the matching result $S'_{ijm}$ of each of the reference images in the reference image matching result storage section 50, and extracts reference images in the descending order of the similarity $D_i$ of the matching result. Furthermore, in the three-dimensional object model generation section 27 in the fourth and sixth embodiments as well, representative three-dimensional object models may be combined every partial region.

In the first to sixth embodiments of the present invention, operation of retrieving an image of the same object as the input image from among a large number of reference images has been described. However, it is also possible to apply the present invention to one-to-one matching for determining whether a specific reference image is an image of the same object as the input image.

It is supposed that a specific reference image is $R_1$. In the first and second embodiments, the result matching section 60 calculates a similarity $D_1=D(S_{0j}, S_{1j})$ between the matching result $S_{0j}$ of the input image and the matching result $S_{1j}$ of the reference image $R_1$. If the similarity $D_1$ is greater than a threshold, $R_1$ can be judged to be the same object as the input image. In the third, fourth, fifth and sixth embodiments, the judgment can be made by determining whether the similarity between the input image and a specific reference image in the second image matching section 41 and the partial image matching section 45 is greater than a threshold.

In the image matching system according to the present invention, it is a matter of course that functions of components can be implemented by using hardware. The functions can also be implemented by reading an image matching program 500 into a computer to make the computer execute the functions of components. The image matching program 500 is stored in a recording medium such as a magnetic disk or a semiconductor memory. The computer reads the image matching program 500 from the recording medium.

INDUSTRIAL APPLICABILITY

The present invention can be used for person identification, individual authentication, or the like using an image of a face or the like.

The invention claimed is:

1. An image matching system for retrieving a reference image similar to an input image, the image matching system comprising:
   means for making a first match between the input image and a plurality of representative three-dimensional object models;
   means for making a second match between the reference image and the plurality of the representative three-dimensional object models;
   means for retrieving the reference image similar to the input image based on the first match and the second match;
   image input means for inputting the input image;
   a representative three-dimensional object model storage section for storing the plurality of the representative three-dimensional object models;
   first image generation means for generating at least one comparison image close in input condition to the input image for each representative three-dimensional object model among the plurality of the representative three-dimensional object models based on the plurality of the representative three-dimensional object models stored in the representative three-dimensional object model storage section;
   first image matching means for calculating similarities between the input image and the at lease one comparison image of the each representative three-dimensional object model generated by the first image generation means, and selecting the least one comparison image of a representative three-dimensional object model among the plurality of the representative three-dimensional object models which has a greatest similarity with the input image based on the similarities calculated by the first image matching means;
   a reference image storage section for storing reference images of objects;
   a reference image matching result storage section for storing similarities between the reference images stored in the reference image storage section and the plurality of the representative three-dimensional object models stored in the representative three-dimensional object model storage section;
   result matching means for extracting reference images to the input image based on the similarities between the input image and the at lease one comparison image of the each representative three-dimensional object model calculated by the first image matching means and the similarities between the reference images and the plurality of the representative three-dimensional object models stored in the reference image matching result storage section
   three-dimensional object model registration means for registering the plurality of the representative three-dimensional object models in the representative three-dimensional object model storage section;
   reference image registration means for registering the reference images in the reference image storage section; and
   reference image matching result update means for calculating a similarity using the second image matching means, when a new representative-dimensional object model is registered in the representative three-dimensional object model storage section by the three-dimensional object model registration means, or when a new reference image is registered in the reference image storage section by the reference image registration means, and adding the calculated similarity to the similarities stored in the reference image matching result storage section.

2. An image matching system for retrieving a reference image similar to an input image, the image matching system comprising:
   means for making a first match between the input image and a plurality of representative three-dimensional object models;
   means for making a second match between the reference image and the plurality of the representative three-dimensional object models;
   means for retrieving the reference image similar to the input image based on the first match and the second match;
   image input means for inputting the input image;
   a representative three-dimensional object model storage section for storing the plurality of the representative three-dimensional object models;
   first image generation means for generating at least one comparison image close in input condition to the input image for each representative three-dimensional object model among the plurality of the representative three-dimensional object models based on the plurality of the representative three-dimensional object models stored in the representative three-dimensional object model storage section;
   first image matching means for calculating similarities between the input image and the at lease one comparison image of the each representative three-dimensional object model generated by the first image generation means, and selecting the at least one comparison image of a representative three-dimensional object model among the plurality of the representative three-dimensional object models which has a greatest similarity with the input image based on the similarities calculated by the first image matching means;

a reference image storage section for storing reference images of objects;

a reference image matching result storage section for storing similarities between the reference images stored in the reference image storage section and the plurality of the representative three-dimensional object models stored in the representative three-dimensional object model storage section; and result matching means for extracting reference images similar to the input image based on the similarities between the input image and the at lease one comparison image of the each representative three-dimensional object model calculated by the first image matching means and the similarities between the reference images and the plurality of the representative three-dimensional object models stored in the reference image matching result storage section, wherein the first image matching means calculates a similarity between the input image and the at least one comparison image of the each representative three-dimensional object model for a partial region of the input image, the reference image matching result storage section stores similarities between the reference images stored in the reference image storage section and the plurality of the representative three-dimensional object models stored in the representative three-dimensional object model storage section for the partial region of each of the reference images, and the result matching means extracts the reference images similar to the input image based on the similarities between the input image and the at least one comparison image of the each representative three-dimensional object model calculated by the first image matching means for the partial region of the input image and the similarities between the reference images and the plurality of the representative three-dimensional object models for the partial region of each of the reference images stored in the reference image matching result storage section.

3. An image matching system for retrieving a reference image similar to an input image, the image matching system comprising:

means for making a first match between the input image and a plurality of representative three-dimensional object models;

means for making a second match between the reference image and the plurality of the representative three-dimensional object models;

means for retrieving the reference image similar to the input image based on the first match and the second match;

image input means for inputting the input image;

a representative three-dimensional object model storage section for storing the plurality of the representative three-dimensional object models;

first image generation means for generating at least one comparison image close in input condition to the input image for each representative three-dimensional object model among the plurality of the representative three-dimensional object models based on the plurality of the representative three-dimensional object models stored in the representative three-dimensional object model storage section;

first image matching means for calculating similarities between the input image and the at lease one comparison image of the each representative three-dimensional object model generated by the first image generation means, and selecting the at least one comparison image of a representative three-dimensional object model among the plurality of the representative three-dimensional object models which has a greatest similarity with the input image based on the similarities calculated by the first image matching means;

a reference image storage section for storing reference images of objects;

a reference image matching result storage section for storing similarities between the reference images stored in the reference image storage section and the plurality of the representative three-dimensional object models stored in the representative three-dimensional object model storage section; and result matching means for extracting reference images similar to the input image based on the similarities between the input image and the at lease one comparison image of the each representative three-dimensional object model calculated by the first image matching means and the similarities between the reference images and the plurality of the representative three-dimensional object models stored in the reference image matching result storage section, wherein the result matching means calculates similarities between the similarities between the input image and the at least one comparison image of the each representative three-dimensional object model and the similarities between the reference images and the plurality of the representative three-dimensional object models, and in the calculation, provides the resultant similarities with weights based on candidate precedence of similarities between the input image and the comparison images and the at least one comparison image of the each representative three-dimensional object model.

4. An image matching system for retrieving a reference image similar to an input image, the image matching system comprising:

means for making a first match between the input image and a plurality of representative three-dimensional object models;

means for making a second match between the reference image and the plurality of the representative three-dimensional object models;

means for retrieving the reference image similar to the input image based on the first match and the second match;

means for determining a reference three-dimensional object model associated with the reference image similar to the input image;

means for retrieving an updated reference image similar to the input image by using the determined reference three-dimensional object model and the input image;

image input means for inputting the input image;

a representative three-dimensional object model storage section for storing the plurality of the representative three-dimensional object models;

first image generation means for generating at least one comparison image close in input condition to the input image for each representative three-dimensional object model among the plurality of the representative three-dimensional object models based on the plurality of the representative three-dimensional object models stored in the representative three-dimensional object model storage section;

first image matching means for calculating similarities between the input image and the at lease one comparison image of the each representative three-dimensional object model generated by the first image generation means, and selecting the at least one comparison image of a representative three-dimensional object model among the plurality of the representative three-dimensional object models which has a greatest similarity with the input image based on the similarities calculated by the first image matching means;

a reference image storage section for storing reference images of objects;

a reference image matching result storage section for storing similarities between the reference images stored in the reference image storage section and the plurality of the representative three-dimensional object models stored in the representative three-dimensional object model storage section;

result matching means for extracting reference images similar to the input image based on the similarities between the input image and the at lease one comparison image of the each representative three-dimensional object model calculated by the first image matching means and the similarities between the reference images and the plurality of the representative three-dimensional object models stored in the reference image matching result storage section;

a reference three-dimensional object model storage section for storing reference three-dimensional object models associated with each reference image among the reference images stored in the reference image storage section;

second image generation means for obtaining reference three-dimensional object models associated with the reference images extracted by the result matching means, from the reference three-dimensional object model storage section, and generating at least one second comparison image close in input condition to the input image for each obtained reference three-dimensional object model based on the obtained reference three-dimensional object models;

second image matching means for calculating similarities between the input image and the at least one second comparison image of each obtained reference three-dimensional object model generated by the second image generation means, and selecting the at least one second comparison of an obtained reference three-dimensional object model among the obtained reference three-dimensional object models which has a greatest similarity with the input image based on the similarities calculated by the second image matching means;

three-dimensional object model registration means for registering the plurality of the representative three-dimensional object models in the representative three-dimensional object model storage section;

reference image registration means for registering the reference images in the reference image storage section;

reference image matching result update means for calculating a similarity using the second image matching means, when a new representative three-dimensional object model is registered in the representative three-dimensional object model storage section by the three-dimensional object model registration means, or when a new reference image is registered in the reference image storage section by the reference image registration means, and adding the calculated similarity to the similarities stored in the reference image matching result storage section; and three-dimensional object model generation means responsive to addition of the calculated similarity to the similarities stored in the reference image matching result storage section by the reference image matching result update means, for generating the reference three-dimensional object model associated with the reference image by combining the plurality of the representative three-dimensional object models stored in the representative three-dimensional object model storage section based on the added similarity, and registering the generated reference three-dimensional object model in the reference three-dimensional object model storage section.

5. The image matching system according to claim 4, wherein the three-dimensional object model generation means generates the reference three-dimensional object models associated with each reference image among the reference images stored in the reference image storage section by combining the plurality of the representative three-dimensional object models stored in the representative three-dimensional object model storage section for a partial region of each of the reference images, based on similarities obtained between the partial region of each of the reference images stored in the reference image storage section and the plurality of the representative three-dimensional object models stored in the representative three-dimensional object model storage section, and registers the generated reference three-dimensional object models in the reference three-dimensional object model storage section.

6. An image matching system for retrieving a reference image similar to an input image, the image matching system comprising:

means for making a first match between the input image and a plurality of representative three-dimensional object models;

means for making a second match between the reference image and the plurality of the representative three-dimensional object models;

means for retrieving the reference image similar to the input image based on the first match and the second match;

means for determining a reference three-dimensional object model associated with the reference image similar to the input image;

means for retrieving an updated reference image similar to the input image by using the determined reference three-dimensional object model and the input image; image input means for inputting the input image;

a representative three-dimensional object model storage section for storing the plurality of the representative three-dimensional object models;

first image generation means for generating at least one comparison image close in input condition to the input image for each representative three-dimensional object model among the plurality of the representative three-dimensional object models based on the plurality of the representative three-dimensional object models stored in the representative three-dimensional object model storage section first image matching means for calculating similarities between the input image and the at lease one comparison image of the each representative three-dimensional object model generated by the first image generation means, and selecting the at least one comparison image of a representative three-dimensional object model among the plurality of the representative three-dimensional object models which has a greatest similarity with the input image based on the similarities calculated by the first image matching means;

a reference image storage section for storing reference images of objects;

a reference image matching result storage section for storing similarities between the reference images stored in the reference image storage section and the plurality of the representative three-dimensional object models stored in the representative three-dimensional object model storage section;

result matching means for extracting reference images similar to the input image based on the similarities between the input image and the at lease one comparison image of the each representative three-dimensional object model calculated by the first image matching means and the similarities between the reference images and the plurality of the representative three-dimensional object models stored in the reference image matching result storage section;

a reference three-dimensional object model storage section for storing reference three-dimensional object models associated with each reference image among the reference images stored in the reference image storage section;

second image generation means for obtaining reference three-dimensional object models associated with the reference images extracted by the result matching means, from the reference three-dimensional object model storage section, and generating at least one second comparison image close in input condition to the input image for each obtained reference three-dimensional object model based on the obtained reference three-dimensional object models; and second image matching means for calculating similarities between the input image and the at least one second comparison image of each obtained reference three-dimensional object model generated by the second image generation means, and selecting the at least one second comparison of an obtained reference three-dimensional object model among the obtained reference three-dimensional object models which has a greatest similarity with the input image based on the similarities calculated by the second image matching means, wherein the first image matching means calculates a similarity between the input image and the at least one comparison image of the each representative three-dimensional object model for a partial region of the input image, the reference image matching result storage section stores similarities between the reference images stored in the reference image storage section and the plurality of the representative three-dimensional object models stored in the representative three-dimensional object model storage section for the partial region of each of the reference images, and the result matching means extracts the reference images similar to the input image based on the similarities between the input image and the at least one comparison image of the each representative three-dimensional object model calculated by the first image matching means for the partial region of the input image and the similarities between the reference images and the plurality of the representative three-dimensional object models for the partial region of each of the reference images stored in the reference image matching result storage section.

7. An image matching system for retrieving a reference image similar to an input image, the image matching system comprising:

means for making a first match between the input image and a plurality of representative three-dimensional object models;

means for making a second match between the reference image and the plurality of the representative three-dimensional object models;

means for retrieving the reference image similar to the input image based on the first match and the second match;

means for determining a reference three-dimensional object model associated with the reference image similar to the input image;

means for retrieving an updated reference image similar to the input image by using the determined reference three-dimensional object model and the input image;

image input means for inputting the input image;

a representative three-dimensional object model storage section for storing the plurality of the representative three-dimensional object models;

first image generation means for generating at least one comparison image close in input condition to the input image for each representative three-dimensional object model among the plurality of the representative three-dimensional object models based on the plurality of the representative three-dimensional object models stored in the representative three-dimensional object model storage section;

first image matching means for calculating similarities between the input image and the at lease one comparison image of the each representative three-dimensional object model generated by the first image generation means, and selecting the at least one comparison image of a representative three-dimensional object model among the plurality of the representative three-dimensional object models which has a greatest similarity with the input image based on the similarities calculated by the first image matching means;

a reference image storage section for storing reference images of objects;

a reference image matching result storage section for storing similarities between the reference images stored in the reference image storage section and the plurality of the representative three-dimensional object models stored in the representative three-dimensional object model storage section;

result matching means for extracting reference images similar to the input image based on the similarities between the input image and the at lease one comparison image of the each representative three-dimensional object model calculated by the first image matching means and the similarities between the reference images and the plurality of the representative three-dimensional object models stored in the reference image matching result storage section;

a reference three-dimensional object model storage section for storing reference three-dimensional object models associated with each reference image among the reference images stored in the reference image storage section;

second image generation means for obtaining reference three-dimensional object models associated with the reference images extracted by the result matching means, from the reference three-dimensional object model storage section, and generating at least one second comparison image close in input condition to the input image for each obtained reference three-dimensional object model based on the obtained reference three-dimensional object models; and second image matching means for calculating similarities between the input image and the at least one second comparison image of each obtained reference three-dimensional object model generated by the second image generation means, and selecting the at least one second comparison of an obtained reference three-dimensional object model among the obtained reference three-dimensional object models which has a greatest similarity with the input image based on the similarities calculated by the second image matching means, wherein the result matching means calculates similarities between the similarities between the input image and the at least one comparison image of the each representative three-dimensional object model and the similarities between the reference images and the plurality of the representative three-dimensional object models, and in the calculation, provides the resultant similarities with weights based on candidate precedence of similarities between the input image and the comparison images and the at least one comparison image of the each representative three-dimensional object model.

8. An image matching system for retrieving a reference image similar to an input image, the image matching system comprising:

means for making a first match between the input image and a plurality of representative three-dimensional object models;

means for making a second match between the reference image and the plurality of the representative three-dimensional object models;

means for retrieving the reference image similar to the input image based on the first match and the second match;

means for determining a reference three-dimensional object model associated with the reference image similar to the input image;

conversion means for equating an input condition of the input image with an input condition of the reference image by converting the input image and/or the reference image based on the determined reference three-dimensional object model;

means for retrieving the reference image similar to the input image by making a third match between the input image and the reference image equated to the input condition of the input image;

image input means for inputting the input image;

a representative three-dimensional object model storage section for storing the plurality of the representative three-dimensional object models;

first image generation means for generating at least one comparison image close in input condition to the input image for each representative three-dimensional object model among the plurality of the representative three-dimensional object models based on the plurality of the representative three-dimensional object models stored in the representative three-dimensional object model storage section;

first image matching means for calculating similarities between the input image and the at lease one comparison image of the each representative three-dimensional object model generated by the first image generation means, and selecting the at least one comparison image of a representative three-dimensional object model among the plurality of the representative three-dimensional object models which has a greatest similarity with the input image based on the similarities calculated by the first image matching means;

a reference image storage section for storing reference images of objects;

a reference image matching result storage section for storing similarities between the reference images stored in the reference image storage section and the plurality of the representative three-dimensional object models stored in the representative three-dimensional object model storage section;

result matching means for extracting reference images similar to the input image based on the similarities between the input image and the at lease one comparison image of the each representative three-dimensional object model calculated by the first image matching means and the similarities between the reference images and the plurality of the representative three-dimensional object models stored in the reference image matching result storage section;

a reference three-dimensional object model storage section for storing reference three-dimensional object models associated with each reference image among the reference images stored in the reference image storage section;

image conversion means for obtaining reference three-dimensional object models associated with the reference images extracted by the result matching means, from the reference three-dimensional object model storage section, equating the input condition of the input image with the input condition of each of the reference images extracted by the result matching means by converting the reference images extracted by the result matching means based on the obtained reference three-dimensional object models, and generating a partial image of the input image and partial images of the reference images equated to the input condition of the input image;

partial image matching means for calculating a similarity between the partial image of the input image and the partial images of the reference images generated by the image conversion means;

three-dimensional object model registration means for registering the plurality of the representative three-dimensional object models in the representative three-dimensional object model storage section;

reference image registration means for registering the reference images in the reference image storage section;

reference image matching result update means for calculating a similarity using the second image matching means, when a new representative three-dimensional object model is registered in the representative three-dimensional object model storage section by the three-dimensional object model registration means, or when a new reference image is registered in the reference image storage section by the reference image registration means, and adding the calculated similarity to the similarities stored in the reference image matching result storage section; and three-dimensional object model generation means responsive to addition of the calculated similarity to the similarities stored in the reference image matching result storage section by the reference image matching result update means, for generating the reference three-dimensional object model associated with the reference image by combining the plurality of the representative three-dimensional object models stored in the representative three-dimensional object model storage section based on the added similarity, and registering the generated reference three-dimensional object model in the reference three-dimensional object model storage section.

9. The image matching system according to claim 8, wherein the three-dimensional object model generation means generates the reference three-dimensional object models associated with each reference image among the reference images stored in the reference image storage section by combining the plurality of the representative three-dimensional object models stored in the representative three-dimensional object model storage section for a partial region of each of the reference images, based on similarities obtained between the partial region of each of the reference images stored in the reference image storage section and the plurality of the representative three-dimensional object models stored in the representative three-dimensional object model storage section, and registers the generated reference three-dimensional object models in the reference three-dimensional object model storage section.

10. An image matching system for retrieving a reference image similar to an input image, the image matching system comprising:

means for making a first match between the input image and a plurality of representative three-dimensional object models;

means for making a second match between the reference image and the plurality of the representative three-dimensional object models;

means for retrieving the reference image similar to the input image based on the first match and the second match;

means for determining a reference three-dimensional object model associated with the reference image similar to the input image;

conversion means for equating an input condition of the input image with an input condition of the reference image by converting the input image and/or the reference image based on the determined reference three-dimensional object model;

means for retrieving the reference image similar to the input image by making a third match between the input image and the reference image equated to the input condition of the input image;

image input means for inputting the input image;

a representative three-dimensional object model storage section for storing the plurality of the representative three-dimensional object models;

first image generation means for generating at least one comparison image close in input condition to the input image for each representative three-dimensional object model among the plurality of the representative three-dimensional object models based on the plurality of the representative three-dimensional object models stored in the representative three-dimensional object model storage section;

first image matching means for calculating similarities between the input image and the at lease one comparison image of the each representative three-dimensional object model generated by the first image generation means, and selecting the at least one comparison image of a representative three-dimensional object model among the plurality of the representative three-dimensional object models which has a greatest similarity with the input image based on the similarities calculated by the first image matching means;

a reference image storage section for storing reference images of objects;

a reference image matching result storage section for storing similarities between the reference images stored in the reference image storage section and the plurality of the representative three-dimensional object models stored in the representative three-dimensional object model storage section;

result matching means for extracting reference images similar to the input image based on the similarities between the input image and the at lease one comparison image of the each representative three-dimensional object model calculated by the first image matching means and the similarities between the reference images and the plurality of the representative three-dimensional object models stored in the reference image matching result storage section;

a reference three-dimensional object model storage section for storing reference three-dimensional object models associated with each reference image among the reference images stored in the reference image storage section;

image conversion means for obtaining reference three-dimensional object models associated with the reference images extracted by the result matching means, from the reference three-dimensional object model storage section, equating the input condition of the input image with the input condition of each of the reference images extracted by the result matching means by converting the reference images extracted by the result matching means based on the obtained reference three-dimensional object models, and generating a partial image of the input image and partial images of the reference images equated to the input condition of the input image; and partial image matching means for calculating a similarity between the partial image of the input image and the partial images of the reference images generated by the image conversion means wherein the first image matching means calculates a similarity between the input image and the at least one comparison image of the each representative three-dimensional object model for a partial region of the input image, the reference image matching result storage section stores similarities between the reference images stored in the reference image storage section and the plurality of the representative three-dimensional object models stored in the representative three-dimensional object model storage section for the partial region of each of the reference images, and the result matching means extracts the reference images similar to the input image based on the similarities between the input image and the at least one comparison image of the each representative three-dimensional object model calculated by the first image matching means for the partial region of the input image and the similarities between the reference images and the plurality of the representative three-dimensional object models for the partial region of each of the reference images stored in the reference image matching result storage section.

11. An image matching system for retrieving a reference image similar to an input image, the image matching system comprising:
    means for making a first match between the input image and a plurality of representative three-dimensional object models;
    means for making a second match between the reference image and the plurality of the representative three-dimensional object models;
    means for retrieving the reference image similar to the input image based on the first match and the second match;
    means for determining a reference three-dimensional object model associated with the reference image similar to the input image;
    conversion means for equating an input condition of the input image with an input condition of the reference image by converting the input image and/or the reference image based on the determined reference three-dimensional object model;
    means for retrieving the reference image similar to the input image by making a third match between the input image and the reference image equated to the input condition of the input image;
    image input means for inputting the input image;
    a representative three-dimensional object model storage section for storing the plurality of the representative three-dimensional object models;
    first image generation means for generating at least one comparison image close in input condition to the input image for each representative three-dimensional object model among the plurality of the representative three-dimensional object models based on the plurality of the representative three-dimensional object models stored in the representative three-dimensional object model storage section;
    first image matching means for calculating similarities between the input image and the at lease one comparison image of the each representative three-dimensional object model generated by the first image generation means, and selecting the at least one comparison image of a representative three-dimensional object model among the plurality of the representative three-dimensional object models which has a greatest similarity with the input image based on the similarities calculated by the first image matching means;
    a reference image storage section for storing reference images of objects;
    a reference image matching result storage section for storing similarities between the reference images stored in the reference image storage section and the plurality of the representative three-dimensional object models stored in the representative three-dimensional object model storage section;
    result matching means for extracting reference images similar to the input image based on the similarities between the input image and the at lease one comparison image of the each representative three-dimensional object model calculated by the first image matching means and the similarities between the reference images and the plurality of the representative three-dimensional object models stored in the reference image matching result storage section;
    a reference three-dimensional object model storage section for storing reference three-dimensional object models associated with each reference image among the reference images stored in the reference image storage section;
    image conversion means for obtaining reference three-dimensional object models associated with the reference images extracted by the result matching means, from the reference three-dimensional object model storage section, equating the input condition of the input image with the input condition of each of the reference images extracted by the result matching means by converting the reference images extracted by the result matching means based on the obtained reference three-dimensional object models, and generating a partial image of the input image and partial images of the reference images equated to the input condition of the input image; and
    partial image matching means for calculating a similarity between the partial image of the input image and the partial images of the reference images generated by the image conversion means,
    wherein the result matching means calculates similarities between the similarities between the input image and the at least one comparison image of the each representative three-dimensional object model and the similarities between the reference images and the plurality of the representative three-dimensional object models, and in the calculation, provides the resultant similarities with weights based on candidate precedence of similarities between the input image and the comparison images and the at least one comparison image of the each representative three-dimensional object model.

12. An image matching method for retrieving a reference image similar to an input image, the image matching method comprising:
    using a processor to perform
    a step of making a first match between the input image and a plurality of representative three-dimensional object models;
    a step of making a second match between the reference image and the plurality of the representative three-dimensional object models;
    a step of retrieving the reference image similar to the input image based on the first match and the second match;
    an image input step of inputting the input image;
    a step of storing the plurality of the representative three-dimensional object models in a representative three-dimensional object model storage section;
    a first image generation step of generating at least one comparison image close in input condition to the input image for each representative three-dimensional object model among the plurality of the representative three-dimensional object models based on the plurality of the representative three-dimensional object models stored in the representative three-dimensional object model storage section;
    a first image matching step of calculating similarities between the input image and the at lease one comparison image of the each representative three-dimensional object model generated by the first image generation step, and selecting the at least one comparison image of a representative three-dimensional object model among the plurality of the representative three-dimensional object models which has a greatest similarity with the input image based on the similarities calculated by the first image matching step;

a step of storing reference images of objects in a reference image storage section;
a step of storing similarities between the reference images stored in the reference image storage section and the plurality of the representative three-dimensional object models stored in the representative three-dimensional object model storage section, in a reference image matching result storage section;
a result matching step of extracting reference images similar to the input image based on the similarities between the input image and the at lease one comparison image of the each representative three-dimensional object model calculated by the first image matching step and the similarities between the reference images and the plurality of the representative three-dimensional object models stored in the reference image matching result storage section;
a three-dimensional object model registration step of registering the plurality of the representative three-dimensional object models in the representative three-dimensional object model storage section;
a reference image registration step of registering the reference images in the reference image storage section; and
a reference image matching result update step of calculating a similarity in the second image matching step, when a new representative three-dimensional object model is registered in the representative three-dimensional object model storage section in the three-dimensional object model registration step, or when a new reference image is registered in the reference image storage section in the reference image registration in, and adding the calculated similarity to the similarities stored in the reference image matching result storage section.

13. An image matching method for retrieving a reference image similar to an input image, the image matching method comprising:
using a processor to perform
a step of making a first match between the input image and a plurality of representative three-dimensional object models;
a step of making a second match between the reference image and the plurality of the representative three-dimensional object models;
a step of retrieving the reference image similar to the input image based on the first match and the second match;
an image input step of inputting the input image;
a step of storing the plurality of the representative three-dimensional object models in a representative three-dimensional object model storage section;
a first image generation step of generating at least one comparison image close in input condition to the input image for each representative three-dimensional object model among the plurality of the representative three-dimensional object models based on the plurality of the representative three-dimensional object models stored in the representative three-dimensional object model storage section;
a first image matching step of calculating similarities between the input image and the at lease one comparison image of the each representative three-dimensional object model generated by the first image generation step, and selecting the at least one comparison image of a representative three-dimensional object model among the plurality of the representative three-dimensional object models which has a greatest similarity with the input image based on the similarities calculated by the first image matching step;

a step of storing reference images of objects in a reference image storage section;
a step of storing similarities between the reference images stored in the reference image storage section and the plurality of the representative three-dimensional object models stored in the representative three-dimensional object model storage section, in a reference image matching result storage section; and
a result matching step of extracting reference images similar to the input image based on the similarities between the input image and the at lease one comparison image of the each representative three-dimensional object model calculated by the first image matching step and the similarities between the reference images and the plurality of the representative three-dimensional object models stored in the reference image matching result storage section,
wherein at the first image matching step, a similarity between the input image and the at least one comparison image of the each representative three-dimensional object model for a partial region of the input image is calculated,
the reference image matching result storage section stores similarities between the reference images stored in the reference image storage section and the plurality of the representative three-dimensional object models stored in the representative three-dimensional object model storage section for the partial region of each of the reference images, and
at the result matching step, the reference images similar to the input image are extracted based on the similarities between the input image and the at least one comparison image of the each representative three-dimensional object model calculated by the first image matching means for the partial region of the input image and the similarities between the reference images and the plurality of the representative three-dimensional object models for the partial region of each of the reference images stored in the reference image matching result storage section.

14. An image matching method for retrieving a reference image similar to an input image, the image matching method comprising:
using a processor to perform
a step of making a first match between the input image and a plurality of representative three-dimensional object models;
a step of making a second match between the reference image and the plurality of the representative three-dimensional object models;
a step of retrieving the reference image similar to the input image based on the first match and the second match;
an image input step of inputting the input image;
a step of storing the plurality of the representative three-dimensional object models in a representative three-dimensional object model storage section;
a first image generation step of generating at least one comparison image close in input condition to the input image for each representative three-dimensional object model among the plurality of the representative three-dimensional object models based on the plurality of the representative three-dimensional object models stored in the representative three-dimensional object model storage section;
a first image matching step of calculating similarities between the input image and the at lease one comparison image of the each representative three-dimensional object model generated by the first image generation step, and selecting the at least one comparison image of a representative three-dimensional object model among the plurality of the representative three-dimensional object models which has a greatest similarity with the input image based on the similarities calculated by the first image matching step;

a step of storing reference images of objects in a reference image storage section;

a step of storing similarities between the reference images stored in the reference image storage section and the plurality of the representative three-dimensional object models stored in the representative three-dimensional object model storage section, in a reference image matching result storage section; and a result matching step of extracting reference images similar to the input image based on the similarities between the input image and the at lease one comparison image of the each representative three-dimensional object model calculated by the first image matching step and the similarities between the reference images and the plurality of the representative three-dimensional object models stored in the reference image matching result storage section, wherein at the result matching step, similarities between the similarities between the input image and the at least one comparison image of the each representative three-dimensional object model and the similarities between the reference images and the plurality of the representative three-dimensional object models are calculated, and in the calculation, the resultant similarities are provided with weights based on candidate precedence of similarities between the input image and the comparison images and the at least one comparison image of the each representative three-dimensional object model.

15. An image matching method for retrieving a reference image similar to an input image, the image matching method comprising:

using a processor to perform a step of making a first match between the input image and a plurality of representative three-dimensional object models;

a step of making a second match between the reference image and the plurality of the representative three-dimensional object models;

a step of retrieving the reference image similar to the input image based on the first match and the second match;

a step of determining a reference three-dimensional object model associated with the reference image similar to the input image;

a step of retrieving an updated reference image similar to the input image by using the determined reference three-dimensional object model and the input image;

an image input step of inputting the input image;

a step of storing the plurality of the representative three-dimensional object models in a representative three-dimensional object model storage section;

a first image generation step of generating at least one comparison image close in input condition to the input image for each representative three-dimensional object model among the plurality of the representative three-dimensional object models based on the plurality of the representative three-dimensional object models stored in the representative three-dimensional object model storage section;

a first image matching step of calculating similarities between the input image and the at lease one comparison image of the each representative three-dimensional object model generated by the first image generation step, and selecting the at least one comparison image of a representative three-dimensional object model among the plurality of the representative three-dimensional object models which has a greatest similarity with the input image based on the similarities calculated by the first image matching step;

a step of storing reference images of objects in a reference image storage section;

a step of storing similarities between the reference images stored in the reference image storage section and the plurality of the representative three-dimensional object models stored in the representative three-dimensional object model storage section, in a reference image matching result storage section;

a result matching step of extracting reference images similar to the input image based on the similarities between the input image and the at lease one comparison image of the each representative three-dimensional object model calculated by the first image matching step and the similarities between the reference images and the plurality of the representative three-dimensional object models stored in the reference image matching result storage section;

a step of storing reference three-dimensional object models associated with each reference image among the reference images stored in the reference image storage section;

a second image generation step of obtaining reference three-dimensional object models associated with the reference images extracted by the result matching step, from the reference three-dimensional object model storage section, and generating at least one second comparison image close in input condition to the input image for each obtained reference three-dimensional object model based on the obtained reference three-dimensional object models;

a second image matching step of calculating similarities between the input image and the at least one second comparison image of each obtained reference three-dimensional object model generated by the second image generation step, and selecting the at least one second comparison of an obtained reference three-dimensional object model among the obtained reference three-dimensional object models which has a greatest similarity with the input image based on the similarities calculated by the second image matching step;

a three-dimensional object model registration step of registering the plurality of the representative three-dimensional object models in the representative three-dimensional object model storage section;

a reference image registration step of registering the reference images in the reference image storage section;

a reference image matching result update step of calculating a similarity in the second image matching step, when a new representative three-dimensional object model is registered in the representative three-dimensional object model storage section in the three-dimensional object model registration step, or when a new reference image is registered in the reference image storage section in the reference image registration in, and adding the calculated similarity to the similarities stored in the reference image matching result storage section; and a three-dimensional object model generation step of, in response to addition of the calculated similarity to the similarities stored in the reference image matching result storage section by the reference image matching result update step, generating the reference three-dimensional object model associated with the reference image by combining the plurality of the representative three-dimensional object models stored in the representative three-dimensional object model storage section based on the added similarity, and registering the generated reference three-dimensional object model in the reference three-dimensional object model storage section.

16. The image matching method according to claim 15, wherein at the three-dimensional object model generation step, the reference three-dimensional object models associated with each reference image among the reference images stored in the reference image storage section is generated by combining the plurality of the representative three-dimensional object models stored in the representative three-dimensional object model storage section for a partial region of each of the reference images, based on similarities obtained between the partial region of each of the reference images stored in the reference image storage section and the plurality of the representative three-dimensional object models stored in the representative three-dimensional object model storage section, and the generated reference three-dimensional object models are registered in the reference three-dimensional object model storage section.

17. An image matching method for retrieving a reference image similar to an input image, the image matching method comprising:

using a processor to perform a step of making a first match between the input image and a plurality of representative three-dimensional object models;

a step of making a second match between the reference image and the plurality of the representative three-dimensional object models;

a step of retrieving the reference image similar to the input image based on the first match and the second match;

a step of determining a reference three-dimensional object model associated with the reference image similar to the input image;

a step of retrieving an updated reference image similar to the input image by using the determined reference three-dimensional object model and the input image;

an image input step of inputting the input image;

a step of storing the plurality of the representative three-dimensional object models in a representative three-dimensional object model storage section;

a first image generation step of generating at least one comparison image close in input condition to the input image for each representative three-dimensional object model among the plurality of the representative three-dimensional object models based on the plurality of the representative three-dimensional object models stored in the representative three-dimensional object model storage section;

a first image matching step of calculating similarities between the input image and the at lease one comparison image of the each representative three-dimensional object model generated by the first image generation step, and selecting the at least one comparison image of a representative three-dimensional object model among the plurality of the representative three-dimensional object models which has a greatest similarity with the input image based on the similarities calculated by the first image matching step;

a step of storing reference images of objects in a reference image storage section;

a step of storing similarities between the reference images stored in the reference image storage section and the plurality of the representative three-dimensional object models stored in the representative three-dimensional object model storage section, in a reference image matching result storage section;

a result matching step of extracting reference images similar to the input image based on the similarities between the input image and the at lease one comparison image of the each representative three-dimensional object model calculated by the first image matching step and the similarities between the reference images and the plurality of the representative three-dimensional object models stored in the reference image matching result storage section;

a step of storing reference three-dimensional object models associated with each reference image among the reference images stored in the reference image storage section;

a second image generation step of obtaining reference three-dimensional object models associated with the reference images extracted by the result matching step, from the reference three-dimensional object model storage section, and generating at least one second comparison image close in input condition to the input image for each obtained reference three-dimensional object model based on the obtained reference three-dimensional object models; and a second image matching step of calculating similarities between the input image and the at least one second comparison image of each obtained reference three-dimensional object model generated by the second image generation step, and selecting the at least one second comparison of an obtained reference three-dimensional object model among the obtained reference three-dimensional object models which has a greatest similarity with the input image based on the similarities calculated by the second image matching step, wherein at the first image matching step, a similarity between the input image and the at least one comparison image of the each representative three-dimensional object model for a partial region of the input image is calculated, the reference image matching result storage section stores similarities between the reference images stored in the reference image storage section and the plurality of the representative three-dimensional object models stored in the representative three-dimensional object model storage section for the partial region of each of the reference images, and at the result matching step, the reference images similar to the input image are extracted based on the similarities between the input image and the at least one comparison image of the each representative three-dimensional object model calculated by the first image matching means for the partial region of the input image and the similarities between the reference images and the plurality of the representative three-dimensional object models for the partial region of each of the reference images stored in the reference image matching result storage section.

18. An image matching method for retrieving a reference image similar to an input image, the image matching method comprising:

using a processor to perform a step of making a first match between the input image and a plurality of representative three-dimensional object models;

a step of making a second match between the reference image and the plurality of the representative three-dimensional object models;
a step of retrieving the reference image similar to the input image based on the first match and the second match;
a step of determining a reference three-dimensional object model associated with the reference image similar to the input image;
a step of retrieving an updated reference image similar to the input image by using the determined reference three-dimensional object model and the input image;
an image input step of inputting the input image;
a step of storing the plurality of the representative three-dimensional object models in a representative three-dimensional object model storage section;
a first image generation step of generating at least one comparison image close in input condition to the input image for each representative three-dimensional object model among the plurality of the representative three-dimensional object models based on the plurality of the representative three-dimensional object models stored in the representative three-dimensional object model storage section;
a first image matching step of calculating similarities between the input image and the at lease one comparison image of the each representative three-dimensional object model generated by the first image generation step, and selecting the at least one comparison image of a representative three-dimensional object model among the plurality of the representative three-dimensional object models which has a greatest similarity with the input image based on the similarities calculated by the first image matching step;
a step of storing reference images of objects in a reference image storage section;
a step of storing similarities between the reference images stored in the reference image storage section and the plurality of the representative three-dimensional object models stored in the representative three-dimensional object model storage section, in a reference image matching result storage section;
a result matching step of extracting reference images similar to the input image based on the similarities between the input image and the at lease one comparison image of the each representative three-dimensional object model calculated by the first image matching step and the similarities between the reference images and the plurality of the representative three-dimensional object models stored in the reference image matching result storage section;
a step of storing reference three-dimensional object models associated with each reference image among the reference images stored in the reference image storage section;
a second image generation step of obtaining reference three-dimensional object models associated with the reference images extracted by the result matching step, from the reference three-dimensional object model storage section, and generating at least one second comparison image close in input condition to the input image for each obtained reference three-dimensional object model based on the obtained reference three-dimensional object models; and
a second image matching step of calculating similarities between the input image and the at least one second comparison image of each obtained reference three-dimensional object model generated by the second image generation step, and selecting the at least one second comparison of an obtained reference three-dimensional object model among the obtained reference three-dimensional object models which has a greatest similarity with the input image based on the similarities calculated by the second image matching step,
wherein at the result matching step, similarities between the similarities between the input image and the at least one comparison image of the each representative three-dimensional object model and the similarities between the reference images and the plurality of the representative three-dimensional object models are calculated, and in the calculation, the resultant similarities are provided with weights based on candidate precedence of similarities between the input image and the comparison images and the at least one comparison image of the each representative three-dimensional object model.

19. An image matching method for retrieving a reference image similar to an input image, the image matching method comprising:
using a processor to perform
a step of making a first match between the input image and a plurality of representative three-dimensional object models;
a step of making a second match between the reference image and the plurality of the representative three-dimensional object models;
a step of retrieving the reference image similar to the input image based on the first match and the second match;
a step determining a reference three-dimensional object model associated with the reference image similar to the input image;
a conversion step of equating an input condition of the input image with an input condition of the reference image by converting the input image and/or the reference image based on the determined reference three-dimensional object model;
a step of retrieving the reference image similar to the input image by making a third match between the input image and the reference image equated to the input condition of the input image;
an image input step of inputting the input image;
a step of storing the plurality of the representative three-dimensional object models in a representative three-dimensional object model storage section;
a first image generation step of generating at least one comparison image close in input condition to the input image for each representative three-dimensional object model among the plurality of the representative three-dimensional object models based on the plurality of the representative three-dimensional object models stored in the representative three-dimensional object model storage section;
a first image matching step of calculating similarities between the input image and the at lease one comparison image of the each representative three-dimensional object model generated by the first image generation step, and selecting the at least one comparison image of a representative three-dimensional object model among the plurality of the representative three-dimensional object models which has a greatest similarity with the input image based on the similarities calculated by the first image matching step;
a step of storing reference images of objects in a reference image storage section;
a step of storing similarities between the reference images stored in the reference image storage section and the plurality of the representative three-dimensional object models stored in the representative three-dimensional object model storage section, in a reference image matching result storage section;

a result matching step of extracting reference images similar to the input image based on the similarities between the input image and the at lease one comparison image of the each representative three-dimensional object model calculated by the first image matching step and the similarities between the reference images and the plurality of the representative three-dimensional object models stored in the reference image matching result storage section;

a step of storing reference three-dimensional object models associated with each reference image among the reference images stored in the reference image storage section;

an image conversion step of obtaining reference three-dimensional object models associated with the reference images extracted by the result matching step, from the reference three-dimensional object model storage section, equating the input condition of the input image with the input condition of each of the reference images extracted by the result matching step by converting the reference images extracted at the result matching step based on the obtained reference three-dimensional object models, and generating a partial image of the input image and partial images of the reference images equated to the input condition of the input image;

a partial image matching step of calculating a similarity between the partial image of the input image and the partial images of the reference images generated by the image conversion step;

a three-dimensional object model registration step of registering the plurality of the representative three-dimensional object models in the representative three-dimensional object model storage section;

a reference image registration step of registering the reference images in the reference image storage section;

a reference image matching result update step of calculating a similarity in the second image matching step, when a new representative three-dimensional object model is registered in the representative three-dimensional object model storage section in the three-dimensional object model registration step, or when a new reference image is registered in the reference image storage section in the reference image registration in, and adding the calculated similarity to the similarities stored in the reference image matching result storage section; and a three-dimensional object model generation step of, in response to addition of the calculated similarity to the similarities stored in the reference image matching result storage section by the reference image matching result update step, generating the reference three-dimensional object model associated with the reference image by combining the plurality of the representative three-dimensional object models stored in the representative three-dimensional object model storage section based on the added similarity, and registering the generated reference three-dimensional object model in the reference three-dimensional object model storage section.

20. The image matching method according to claim 19, wherein at the three-dimensional object model generation step, the reference three-dimensional object models associated with each reference image among the reference images stored in the reference image storage section is generated by combining the plurality of the representative three-dimensional object models stored in the representative three-dimensional object model storage section for a partial region of each of the reference images, based on similarities obtained between the partial region of each of the reference images stored in the reference image storage section and the plurality of the representative three-dimensional object models stored in the representative three-dimensional object model storage section, and the generated reference three-dimensional object models are registered in the reference three-dimensional object model storage section.

21. An image matching method for retrieving a reference image similar to an input image, the image matching method comprising:

using a processor to perform a step of making a first match between the input image and a plurality of representative three-dimensional object models;

a step of making a second match between the reference image and the plurality of the representative three-dimensional object models;

a step of retrieving the reference image similar to the input image based on the first match and the second match;

a step determining a reference three-dimensional object model associated with the reference image similar to the input image;

a conversion step of equating an input condition of the input image with an input condition of the reference image by converting the input image and/or the reference image based on the determined reference three-dimensional object model;

a step of retrieving the reference image similar to the input image by making a third match between the input image and the reference image equated to the input condition of the input image;

an image input step of inputting the input image;

a step of storing the plurality of the representative three-dimensional object models in a representative three-dimensional object model storage section;

a first image generation step of generating at least one comparison image close in input condition to the input image for each representative three-dimensional object model among the plurality of the representative three-dimensional object models based on the plurality of the representative three-dimensional object models stored in the representative three-dimensional object model storage section;

a first image matching step of calculating similarities between the input image and the at lease one comparison image of the each representative three-dimensional object model generated by the first image generation step, and selecting the at least one comparison image of a representative three-dimensional object model among the plurality of the representative three-dimensional object models which has a greatest similarity with the input image based on the similarities calculated by the first image matching step;

a step of storing reference images of objects in a reference image storage section;

a step of storing similarities between the reference images stored in the reference image storage section and the plurality of the representative three-dimensional object models stored in the representative three-dimensional object model storage section, in a reference image matching result storage section;

a result matching step of extracting reference images similar to the input image based on the similarities between the input image and the at lease one comparison image of the each representative three-dimensional object model calculated by the first image matching step and the similarities between the reference images and the plurality of the representative three-dimensional object models stored in the reference image matching result storage section;

a step of storing reference three-dimensional object models associated with each reference image among the reference images stored in the reference image storage section;

an image conversion step of obtaining reference three-dimensional object models associated with the reference images extracted by the result matching step, from the reference three-dimensional object model storage section, equating the input condition of the input image with the input condition of each of the reference images extracted by the result matching step by converting the reference images extracted at the result matching step based on the obtained reference three-dimensional object models, and generating a partial image of the input image and partial images of the reference images equated to the input condition of the input image; and a partial image matching step of calculating a similarity between the partial image of the input image and the partial images of the reference images generated by the image conversion step, wherein at the first image matching step, a similarity between the input image and the at least one comparison image of the each representative three-dimensional object model for a partial region of the input image is calculated, the reference image matching result storage section stores similarities between the reference images stored in the reference image storage section and the plurality of the representative three-dimensional object models stored in the representative three-dimensional object model storage section for the partial region of each of the reference images, and at the result matching step, the reference images similar to the input image are extracted based on the similarities between the input image and the at least one comparison image of the each representative three-dimensional object model calculated by the first image matching means for the partial region of the input image and the similarities between the reference images and the plurality of the representative three-dimensional object models for the partial region of each of the reference images stored in the reference image matching result storage section.

22. An image matching method for retrieving a reference image similar to an input image, the image matching method comprising:

using a processor to perform a step of making a first match between the input image and a plurality of representative three-dimensional object models;

a step of making a second match between the reference image and the plurality of the representative three-dimensional object models;

a step of retrieving the reference image similar to the input image based on the first match and the second match;

a step determining a reference three-dimensional object model associated with the reference image similar to the input image;

a conversion step of equating an input condition of the input image with an input condition of the reference image by converting the input image and/or the reference image based on the determined reference three-dimensional object model;

a step of retrieving the reference image similar to the input image by making a third match between the input image and the reference image equated to the input condition of the input image;

an image input step of inputting the input image;

a step of storing the plurality of the representative three-dimensional object models in a representative three-dimensional object model storage section;

a first image generation step of generating at least one comparison image close in input condition to the input image for each representative three-dimensional object model among the plurality of the representative three-dimensional object models based on the plurality of the representative three-dimensional object models stored in the representative three-dimensional object model storage section;

a first image matching step of calculating similarities between the input image and the at lease one comparison image of the each representative three-dimensional object model generated by the first image generation step, and selecting the at least one comparison image of a representative three-dimensional object model among the plurality of the representative three-dimensional object models which has a greatest similarity with the input image based on the similarities calculated by the first image matching step;

a step of storing reference images of objects in a reference image storage section;

a step of storing similarities between the reference images stored in the reference image storage section and the plurality of the representative three-dimensional object models stored in the representative three-dimensional object model storage section, in a reference image matching result storage section;

a result matching step of extracting reference images similar to the input image based on the similarities between the input image and the at lease one comparison image of the each representative three-dimensional object model calculated by the first image matching step and the similarities between the reference images and the plurality of the representative three-dimensional object models stored in the reference image matching result storage section;

a step of storing reference three-dimensional object models associated with each reference image among the reference images stored in the reference image storage section;

an image conversion step of obtaining reference three-dimensional object models associated with the reference images extracted by the result matching step, from the reference three-dimensional object model storage section, equating the input condition of the input image with the input condition of each of the reference images extracted by the result matching step by converting the reference images extracted at the result matching step based on the obtained reference three-dimensional object models, and generating a partial image of the input image and partial images of the reference images equated to the input condition of the input image; and a partial image matching step of calculating a similarity between the partial image of the input image and the partial images of the reference images generated by the image conversion step, wherein at the result matching step, similarities between the similarities between the input image and the at least one comparison image of the each representative three-dimensional object model and the similarities between the reference images and the plurality of the representative three-dimensional object models are calculated, and in the calculation, the resultant similarities are provided with weights based on candidate precedence of similarities between the input image and the comparison images and the at least one comparison image of the each representative three-dimensional object model.

23. A computer readable recording medium storing a program for making a computer execute an image matching method to retrieve a reference image similar to an input image, the image matching method comprising:

a step of making a first match between the input image and a plurality of representative three-dimensional object models;

a step of making a second match between the reference image and the plurality of the representative three-dimensional object models;

a step of retrieving the reference image similar to the input image based on the first match and the second match;

an image input step of inputting the input image;

a step of storing the plurality of the representative three-dimensional object models in a representative three-dimensional object model storage section;

a first image generation step of generating at least one comparison image close in input condition to the input image for each representative three-dimensional object model among the plurality of the representative three-dimensional object models based on the plurality of the representative three-dimensional object models stored in the representative three-dimensional object model storage section;

a first image matching step of calculating similarities between the input image and the at lease one comparison image of the each representative three-dimensional object model generated by the first image generation step, and selecting the at least one comparison image of a representative three-dimensional object model among the plurality of the representative three-dimensional object models which has a greatest similarity with the input image based on the similarities calculated by the first image matching step;

a step of storing reference images of objects in a reference image storage section;

a step of storing similarities between the reference images stored in the reference image storage section and the plurality of the representative three-dimensional object models stored in the representative three-dimensional object model storage section, in a reference image matching result storage section;

a result matching step of extracting reference images similar to the input image based on the similarities between the input image and the at lease one comparison image of the each representative three-dimensional object model calculated by the first image matching step and the similarities between the reference images and the plurality of the representative three-dimensional object models stored in the reference image matching result storage section;

a three-dimensional object model registration step of registering the plurality of the representative three-dimensional object models in the representative three-dimensional object model storage section;

a reference image registration step of registering the reference images in the reference image storage section; and a reference image matching result update step of calculating a similarity in the second image matching step, when a new representative three-dimensional object model is registered in the representative three-dimensional object model storage section in the three-dimensional object model registration step, or when a new reference image is registered in the reference image storage section in the reference image registration in, and adding the calculated similarity to the similarities stored in the reference image matching result storage section.

24. A computer readable recording medium storing a program for making a computer execute an image matching method to retrieve a reference image similar to an input image, the image matching method comprising:

a step of making a first match between the input image and a plurality of representative three-dimensional object models;

a step of making a second match between the reference image and the plurality of the representative three-dimensional object models;

a step of retrieving the reference image similar to the input image based on the first match and the second match;

an image input step of inputting the input image;

a step of storing the plurality of the representative three-dimensional object models in a representative three-dimensional object model storage section;

a first image generation step of generating at least one comparison image close in input condition to the input image for each representative three-dimensional object model among the plurality of the representative three-dimensional object models based on the plurality of the representative three-dimensional object models stored in the representative three-dimensional object model storage section;

a first image matching step of calculating similarities between the input image and the at lease one comparison image of the each representative three-dimensional object model generated by the first image generation step, and selecting the at least one comparison image of a representative three-dimensional object model among the plurality of the representative three-dimensional object models which has a greatest similarity with the input image based on the similarities calculated by the first image matching step;

a step of storing reference images of objects in a reference image storage section;

a step of storing similarities between the reference images stored in the reference image storage section and the plurality of the representative three-dimensional object models stored in the representative three-dimensional object model storage section, in a reference image matching result storage section; and a result matching step of extracting reference images similar to the input image based on the similarities between the input image and the at lease one comparison image of the each representative three-dimensional object model calculated by the first image matching step and the similarities between the reference images and the plurality of the representative three-dimensional object models stored in the reference image matching result storage section, wherein at the first image matching step, a similarity between the input image and the at least one comparison image of the each representative three-dimensional object model for a partial region of the input image is calculated, the reference image matching result storage section stores similarities between the reference images stored in the reference image storage section and the plurality of the representative three-dimensional object models stored in the representative three-dimensional object model storage section for the partial region of each of the reference images, and at the result matching step, the reference images similar to the input image are extracted based on the similarities between the input image and the at least one comparison image of the each representative three-dimensional object model calculated by the first image matching means for the partial region of the input image and the similarities between the reference images and the plurality of the representative three-dimensional object models for the partial region of each of the reference images stored in the reference image matching result storage section.

25. A computer readable recording medium storing a program for making a computer execute an image matching method to retrieve a reference image similar to an input image, the image matching method comprising:

a step of making a first match between the input image and a plurality of representative three-dimensional object models;

a step of making a second match between the reference image and the plurality of the representative three-dimensional object models;

a step of retrieving the reference image similar to the input image based on the first match and the second match;

an image input step of inputting the input image;

a step of storing the plurality of the representative three-dimensional object models in a representative three-dimensional object model storage section;

a first image generation step of generating at least one comparison image close in input condition to the input image for each representative three-dimensional object model among the plurality of the representative three-dimensional object models based on the plurality of the representative three-dimensional object models stored in the representative three-dimensional object model storage section;

a first image matching step of calculating similarities between the input image and the at lease one comparison image of the each representative three-dimensional object model generated by the first image generation step, and selecting the at least one comparison image of a representative three-dimensional object model among the plurality of the representative three-dimensional object models which has a greatest similarity with the input image based on the similarities calculated by the first image matching step;

a step of storing reference images of objects in a reference image storage section;

a step of storing similarities between the reference images stored in the reference image storage section and the plurality of the representative three-dimensional object models stored in the representative three-dimensional object model storage section, in a reference image matching result storage section; and a result matching step of extracting reference images similar to the input image based on the similarities between the input image and the at lease one comparison image of the each representative three-dimensional object model calculated by the first image matching step and the similarities between the reference images and the plurality of the representative three-dimensional object models stored in the reference image matching result storage section, wherein at the result matching step, similarities between the similarities between the input image and the at least one comparison image of the each representative three-dimensional object model and the similarities between the reference images and the plurality of the representative three-dimensional object models are calculated, and in the calculation, the resultant similarities are provided with weights based on candidate precedence of similarities between the input image and the comparison images and the at least one comparison image of the each representative three-dimensional object model.

26. A computer readable recording medium storing a program for making a computer execute an image matching method to retrieve a reference image similar to an input image, the image matching method comprising:

a step of making a first match between the input image and a plurality of representative three-dimensional object models;

a step of making a second match between the reference image and the plurality of the representative three-dimensional object models;

a step of retrieving the reference image similar to the input image based on the first match and the second match;

a step of determining a reference three-dimensional object model associated with the reference image similar to the input image;

a step of retrieving an updated reference image similar to the input image by using the determined reference three-dimensional object model and the input image;

an image input step of inputting the input image;

a step of storing the plurality of the representative three-dimensional object models in a representative three-dimensional object model storage section;

a first image generation step of generating at least one comparison image close in input condition to the input image for each representative three-dimensional object model among the plurality of the representative three-dimensional object models based on the plurality of the representative three-dimensional object models stored in the representative three-dimensional object model storage section;

a first image matching step of calculating similarities between the input image and the at lease one comparison image of the each representative three-dimensional object model generated by the first image generation step, and selecting the at least one comparison image of a representative three-dimensional object model among the plurality of the representative three-dimensional object models which has a greatest similarity with the input image based on the similarities calculated by the first image matching step;

a step of storing reference images of objects in a reference image storage section;

a step of storing similarities between the reference images stored in the reference image storage section and the plurality of the representative three-dimensional object models stored in the representative three-dimensional object model storage section, in a reference image matching result storage section;

a result matching step of extracting reference images similar to the input image based on the similarities between the input image and the at lease one comparison image of the each representative three-dimensional object model calculated by the first image matching step and the similarities between the reference images and the plurality of the representative three-dimensional object models stored in the reference image matching result storage section;

a step of storing reference three-dimensional object models associated with each reference image among the reference images stored in the reference image storage section;

a second image generation step of obtaining reference three-dimensional object models associated with the reference images extracted by the result matching step, from the reference three-dimensional object model storage section, and generating at least one second comparison image close in input condition to the input image for each obtained reference three-dimensional object model based on the obtained reference three-dimensional object models;

a second image matching step of calculating similarities between the input image and the at least one second comparison image of each obtained reference three-dimensional object model generated by the second image generation step, and selecting the at least one second comparison image of an obtained reference three-dimensional object model among the obtained reference three-dimensional object models which has a greatest similarity with the input image based on the similarities calculated by the second image matching step;

a three-dimensional object model registration step of registering the plurality of the representative three-dimensional object models in the representative three-dimensional object model storage section;

a reference image registration step of registering the reference images in the reference image storage section;

a reference image matching result update step of calculating a similarity in the second image matching step, when a new representative three-dimensional object model is registered in the representative three-dimensional object model storage section in the three-dimensional object model registration step, or when a new reference image is registered in the reference image storage section in the reference image registration in, and adding the calculated similarity to the similarities stored in the reference image matching result storage section; and a three-dimensional object model generation step of, in response to addition of the calculated similarity to the similarities stored in the reference image matching result storage section by the reference image matching result update step, generating the reference three-dimensional object model associated with the reference image by combining the plurality of the representative three-dimensional object models stored in the representative three-dimensional object model storage section based on the added similarity, and registering the generated reference three-dimensional object model in the reference three-dimensional object model storage section.

27. The computer readable recording medium according to claim 26, wherein at the three-dimensional object model generation step, the reference three-dimensional object models associated with each reference image among the reference images stored in the reference image storage section is generated by combining the plurality of the representative three-dimensional object models stored in the representative three-dimensional object model storage section for a partial region of each of the reference images, based on similarities obtained between the partial region of each of the reference images stored in the reference image storage section and the plurality of the representative three-dimensional object models stored in the representative three-dimensional object model storage section, and the generated reference three-dimensional object models are registered in the reference three-dimensional object model storage section.

28. A computer readable recording medium storing a program for making a computer execute an image matching method to retrieve a reference image similar to an input image, the image matching method comprising:

a step of making a first match between the input image and a plurality of representative three-dimensional object models;

a step of making a second match between the reference image and the plurality of the representative three-dimensional object models;

a step of retrieving the reference image similar to the input image based on the first match and the second match;

a step of determining a reference three-dimensional object model associated with the reference image similar to the input image;

a step of retrieving an updated reference image similar to the input image by using the determined reference three-dimensional object model and the input image;

an image input step of inputting the input image;

a step of storing the plurality of the representative three-dimensional object models in a representative three-dimensional object model storage section;

a first image generation step of generating at least one comparison image close in input condition to the input image for each representative three-dimensional object model among the plurality of the representative three-dimensional object models based on the plurality of the representative three-dimensional object models stored in the representative three-dimensional object model storage section;

a first image matching step of calculating similarities between the input image and the at lease one comparison image of the each representative three-dimensional object model generated by the first image generation step, and selecting the at least one comparison image of a representative three-dimensional object model among the plurality of the representative three-dimensional object models which has a greatest similarity with the input image based on the similarities calculated by the first image matching step;

a step of storing reference images of objects in a reference image storage section;

a step of storing similarities between the reference images stored in the reference image storage section and the plurality of the representative three-dimensional object models stored in the representative three-dimensional object model storage section, in a reference image matching result storage section;

a result matching step of extracting reference images similar to the input image based on the similarities between the input image and the at lease one comparison image of the each representative three-dimensional object model calculated by the first image matching step and the similarities between the reference images and the plurality of the representative three-dimensional object models stored in the reference image matching result storage section;

a step of storing reference three-dimensional object models associated with each reference image among the reference images stored in the reference image storage section;

a second image generation step of obtaining reference three-dimensional object models associated with the reference images extracted by the result matching step, from the reference three-dimensional object model storage section, and generating at least one second comparison image close in input condition to the input image for each obtained reference three-dimensional object model based on the obtained reference three-dimensional object models; and a second image matching step of calculating similarities between the input image and the at least one second comparison image of each obtained reference three-dimensional object model generated by the second image generation step, and selecting the at least one second comparison of an obtained reference three-dimensional object model among the obtained reference three-dimensional object models which has a greatest similarity with the input image based on the similarities calculated by the second image matching step, wherein at the first image matching step, a similarity between the input image and the at least one comparison image of the each representative three-dimensional object model for a partial region of the input image is calculated, the reference image matching result storage section stores similarities between the reference images stored in the reference image storage section and the plurality of the representative three-dimensional object models stored in the representative three-dimensional object model storage section for the partial region of each of the reference images, and at the result matching step, the reference images similar to the input image are extracted based on the similarities between the input image and the at least one comparison image of the each representative three-dimensional object model calculated by the first image matching means for the partial region of the input image and the similarities between the reference images and the plurality of the representative three-dimensional object models for the partial region of each of the reference images stored in the reference image matching result storage section.

29. A computer readable recording medium storing a program for making a computer execute an image matching method to retrieve a reference image similar to an input image, the image matching method comprising:

a step of making a first match between the input image and a plurality of representative three-dimensional object models;

a step of making a second match between the reference image and the plurality of the representative three-dimensional object models;

a step of retrieving the reference image similar to the input image based on the first match and the second match;

a step of determining a reference three-dimensional object model associated with the reference image similar to the input image;

a step of retrieving an updated reference image similar to the input image by using the determined reference three-dimensional object model and the input image;

an image input step of inputting the input image;

a step of storing the plurality of the representative three-dimensional object models in a representative three-dimensional object model storage section;

a first image generation step of generating at least one comparison image close in input condition to the input image for each representative three-dimensional object model among the plurality of the representative three-dimensional object models based on the plurality of the representative three-dimensional object models stored in the representative three-dimensional object model storage section;

a first image matching step of calculating similarities between the input image and the at lease one comparison image of the each representative three-dimensional object model generated by the first image generation step, and selecting the at least one comparison image of a representative three-dimensional object model among the plurality of the representative three-dimensional object models which has a greatest similarity with the input image based on the similarities calculated by the first image matching step;

a step of storing reference images of objects in a reference image storage section;

a step of storing similarities between the reference images stored in the reference image storage section and the plurality of the representative three-dimensional object models stored in the representative three-dimensional object model storage section, in a reference image matching result storage section;

a result matching step of extracting reference images similar to the input image based on the similarities between the input image and the at lease one comparison image of the each representative three-dimensional object model calculated by the first image matching step and the similarities between the reference images and the plurality of the representative three-dimensional object models stored in the reference image matching result storage section;

a step of storing reference three-dimensional object models associated with each reference image among the reference images stored in the reference image storage section;

a second image generation step of obtaining reference three-dimensional object models associated with the reference images extracted by the result matching step, from the reference three-dimensional object model storage section, and generating at least one second comparison image close in input condition to the input image for each obtained reference three-dimensional object model based on the obtained reference three-dimensional object models; and a second image matching step of calculating similarities between the input image and the at least one second comparison image of each obtained reference three-dimensional object model generated by the second image generation step, and selecting the at least one second comparison of an obtained reference three-dimensional object model among the obtained reference three-dimensional object models which has a greatest similarity with the input image based on the similarities calculated by the second image matching step, wherein at the result matching step, similarities between the similarities between the input image and the at least one comparison image of the each representative three-dimensional object model and the similarities between the reference images and the plurality of the representative three-dimensional object models are calculated, and in the calculation, the resultant similarities are provided with weights based on candidate precedence of similarities between the input image and the comparison images and the at least one comparison image of the each representative three-dimensional object model.

30. A computer readable recording medium storing a program for making a computer execute an image matching method to retrieve a reference image similar to an input image, the image matching method comprising:

a step of making a first match between the input image and a plurality of representative three-dimensional object models;

a step of making a second match between the reference image and the plurality of the representative three-dimensional object models;

a step of retrieving the reference image similar to the input image based on the first match and the second match;

a step determining a reference three-dimensional object model associated with the reference image similar to the input image;

a conversion step of equating an input condition of the input image with an input condition of the reference image by converting the input image and/or the reference image based on the determined reference three-dimensional object model;

a step of retrieving the reference image similar to the input image by making a third match between the input image and the reference image equated to the input condition of the input image;

an image input step of inputting the input image;

a step of storing the plurality of the representative three-dimensional object models in a representative three-dimensional object model storage section;

a first image generation step of generating at least one comparison image close in input condition to the input image for each representative three-dimensional object model among the plurality of the representative three-dimensional object models based on the plurality of the representative three-dimensional object models stored in the representative three-dimensional object model storage section;

a first image matching step of calculating similarities between the input image and the at lease one comparison image of the each representative three-dimensional object model generated by the first image generation step, and selecting the at least one comparison image of a representative three-dimensional object model among the plurality of the representative three-dimensional object models which has a greatest similarity with the input image based on the similarities calculated by the first image matching step;

a step of storing reference images of objects in a reference image storage section;

a step of storing similarities between the reference images stored in the reference image storage section and the plurality of the representative three-dimensional object models stored in the representative three-dimensional object model storage section, in a reference image matching result storage section;

a result matching step of extracting reference images similar to the input image based on the similarities between the input image and the at lease one comparison image of the each representative three-dimensional object model calculated by the first image matching step and the similarities between the reference images and the plurality of the representative three-dimensional object models stored in the reference image matching result storage section;

a step of storing reference three-dimensional object models associated with each reference image among the reference images stored in the reference image storage section;

an image conversion step of obtaining reference three-dimensional object models associated with the reference images extracted by the result matching step, from the reference three-dimensional object model storage section, equating the input condition of the input image with the input condition of each of the reference images extracted by the result matching step by converting the reference images extracted at the result matching step based on the obtained reference three-dimensional object models, and generating a partial image of the input image and partial images of the reference images equated to the input condition of the input image;

a partial image matching step of calculating a similarity between the partial image of the input image and the partial images of the reference images generated by the image conversion step;

a three-dimensional object model registration step of registering the plurality of the representative three-dimensional object models in the representative three-dimensional object model storage section;

a reference image registration step of registering the reference images in the reference image storage section;

a reference image matching result update step of calculating a similarity in the second image matching step, when a new representative three-dimensional object model is registered in the representative three-dimensional object model storage section in the three-dimensional object model registration step, or when a new reference image is registered in the reference image storage section in the reference image registration in, and adding the calculated similarity to the similarities stored in the reference image matching result storage section; and a three-dimensional object model generation step of, in response to addition of the calculated similarity to the similarities stored in the reference image matching result storage section by the reference image matching result update step, generating the reference three-dimensional object model associated with the reference image by combining the plurality of the representative three-dimensional object models stored in the representative three-dimensional object model storage section based on the added similarity, and registering the generated reference three-dimensional object model in the reference three-dimensional object model storage section.

31. The computer readable recording medium according to claim 30, wherein at the three-dimensional object model generation step, the reference three-dimensional object models associated with each reference image among the reference images stored in the reference image storage section is generated by combining the plurality of the representative three-dimensional object models stored in the representative three-dimensional object model storage section for a partial region of each of the reference images, based on similarities obtained between the partial region of each of the reference images stored in the reference image storage section and the plurality of the representative three-dimensional object models stored in the representative three-dimensional object model storage section, and the generated reference three-dimensional object models are registered in the reference three-dimensional object model storage section.

32. A computer readable recording medium storing a program for making a computer execute an image matching method to retrieve a reference image similar to an input image, the image matching method comprising:
- a step of making a first match between the input image and a plurality of representative three-dimensional object models;
- a step of making a second match between the reference image and the plurality of the representative three-dimensional object models;
- a step of retrieving the reference image similar to the input image based on the first match and the second match;
- a step determining a reference three-dimensional object model associated with the reference image similar to the input image;
- a conversion step of equating an input condition of the input image with an input condition of the reference image by converting the input image and/or the reference image based on the determined reference three-dimensional object model;
- a step of retrieving the reference image similar to the input image by making a third match between the input image and the reference image equated to the input condition of the input image;
- an image input step of inputting the input image;
- a step of storing the plurality of the representative three-dimensional object models in a representative three-dimensional object model storage section;
- a first image generation step of generating at least one comparison image close in input condition to the input image for each representative three-dimensional object model among the plurality of the representative three-dimensional object models based on the plurality of the representative three-dimensional object models stored in the representative three-dimensional object model storage section;
- a first image matching step of calculating similarities between the input image and the at lease one comparison image of the each representative three-dimensional object model generated by the first image generation step, and selecting the at least one comparison image of a representative three-dimensional object model among the plurality of the representative three-dimensional object models which has a greatest similarity with the input image based on the similarities calculated by the first image matching step;
- a step of storing reference images of objects in a reference image storage section;
- a step of storing similarities between the reference images stored in the reference image storage section and the plurality of the representative three-dimensional object models stored in the representative three-dimensional object model storage section, in a reference image matching result storage section;
- a result matching step of extracting reference images similar to the input image based on the similarities between the input image and the at lease one comparison image of the each representative three-dimensional object model calculated by the first image matching step and the similarities between the reference images and the plurality of the representative three-dimensional object models stored in the reference image matching result storage section;
- a step of storing reference three-dimensional object models associated with each reference image among the reference images stored in the reference image storage section;
- an image conversion step of obtaining reference three-dimensional object models associated with the reference images extracted by the result matching step, from the reference three-dimensional object model storage section, equating the input condition of the input image with the input condition of each of the reference images extracted by the result matching step by converting the reference images extracted at the result matching step based on the obtained reference three-dimensional object models, and generating a partial image of the input image and partial images of the reference images equated to the input condition of the input image; and
- a partial image matching step of calculating a similarity between the partial image of the input image and the partial images of the reference images generated by the image conversion step,
- wherein at the first image matching step, a similarity between the input image and the at least one comparison image of the each representative three-dimensional object model for a partial region of the input image is calculated,
- the reference image matching result storage section stores similarities between the reference images stored in the reference image storage section and the plurality of the representative three-dimensional object models stored in the representative three-dimensional object model storage section for the partial region of each of the reference images, and
- at the result matching step, the reference images similar to the input image are extracted based on the similarities between the input image and the at least one comparison image of the each representative three-dimensional object model calculated by the first image matching means for the partial region of the input image and the similarities between the reference images and the plurality of the representative three-dimensional object models for the partial region of each of the reference images stored in the reference image matching result storage section.

33. A computer readable recording medium storing a program for making a computer execute an image matching method to retrieve a reference image similar to an input image, the image matching method comprising:
- a step of making a first match between the input image and a plurality of representative three-dimensional object models;
- a step of making a second match between the reference image and the plurality of the representative three-dimensional object models;
- a step of retrieving the reference image similar to the input image based on the first match and the second match;
- a step determining a reference three-dimensional object model associated with the reference image similar to the input image;
- a conversion step of equating an input condition of the input image with an input condition of the reference image by converting the input image and/or the reference image based on the determined reference three-dimensional object model;
- a step of retrieving the reference image similar to the input image by making a third match between the input image and the reference image equated to the input condition of the input image;
- an image input step of inputting the input image;
- a step of storing the plurality of the representative three-dimensional object models in a representative three-dimensional object model storage section;

a first image generation step of generating at least one comparison image close in input condition to the input image for each representative three-dimensional object model among the plurality of the representative three-dimensional object models based on the plurality of the representative three-dimensional object models stored in the representative three-dimensional object model storage section;

a first image matching step of calculating similarities between the input image and the at lease one comparison image of the each representative three-dimensional object model generated by the first image generation step, and selecting the at least one comparison image of a representative three-dimensional object model among the plurality of the representative three-dimensional object models which has a greatest similarity with the input image based on the similarities calculated by the first image matching step;

a step of storing reference images of objects in a reference image storage section;

a step of storing similarities between the reference images stored in the reference image storage section and the plurality of the representative three-dimensional object models stored in the representative three-dimensional object model storage section, in a reference image matching result storage section;

a result matching step of extracting reference images similar to the input image based on the similarities between the input image and the at lease one comparison image of the each representative three-dimensional object model calculated by the first image matching step and the similarities between the reference images and the plurality of the representative three-dimensional object models stored in the reference image matching result storage section;

a step of storing reference three-dimensional object models associated with each reference image among the reference images stored in the reference image storage section;

an image conversion step of obtaining reference three-dimensional object models associated with the reference images extracted by the result matching step, from the reference three-dimensional object model storage section, equating the input condition of the input image with the input condition of each of the reference images extracted by the result matching step by converting the reference images extracted at the result matching step based on the obtained reference three-dimensional object models, and generating a partial image of the input image and partial images of the reference images equated to the input condition of the input image; and a partial image matching step of calculating a similarity between the partial image of the input image and the partial images of the reference images generated by the image conversion step, wherein at the result matching step, similarities between the similarities between the input image and the at least one comparison image of the each representative three-dimensional object model and the similarities between the reference images and the plurality of the representative three-dimensional object models are calculated, and in the calculation, the resultant similarities are provided with weights based on candidate precedence of similarities between the input image and the comparison images and the at least one comparison image of the each representative three-dimensional object model.

\* \* \* \* \*

UNITED STATES PATENT AND TRADEMARK OFFICE
CERTIFICATE OF CORRECTION

PATENT NO. : 7,545,973 B2
APPLICATION NO. : 10/520661
DATED : June 9, 2009
INVENTOR(S) : Masahiko Hamanaka It is certified that error appears in the above-identified patent and that said Letters Patent is hereby corrected as shown below:

Column 13, line 8, delete "$A_{0.2}=1$, $A_{0.5}=2$, and $A_{0.3}=3$" and insert --$A_{0,2}=1$, $A_{0,5}=2$, and $A_{0,3}=3$--

Signed and Sealed this

Fifteenth Day of June, 2010

David J. Kappos
*Director of the United States Patent and Trademark Office*